US012745123B2

(12) United States Patent
Karapantelakis et al.

(10) Patent No.: US 12,745,123 B2
(45) Date of Patent: Sep. 22, 2026

(54) METHOD AND SYSTEM FOR MANAGING OPERATIONAL TEMPERATURE OF BASE STATION

(71) Applicant: Telefonaktiebolaget LM Ericsson (publ), Stockholm (SE)

(72) Inventors: Athanasios Karapantelakis, Solna (SE); Lackis Eleftheriadis, Valbo (SE); Maxim Teslenko, Sollentuna (SE); Oleg Gorbatov, Luleå (SE); Kristijonas Cyras, San Jose, CA (US); Alexandros Nikou, Danderyd (SE); Gabriella Nordquist, Stockholm (SE); Cecilia Nyström, Stockholm (SE); Rohan Kumar Kudroli, Bangalore Karnataka (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 313 days.

(21) Appl. No.: 18/705,211

(22) PCT Filed: Mar. 28, 2022

(86) PCT No.: PCT/EP2022/058154
§ 371 (c)(1),
(2) Date: Apr. 26, 2024

(87) PCT Pub. No.: WO2023/072436
PCT Pub. Date: May 4, 2023

(65) Prior Publication Data

US 2024/0406776 A1 Dec. 5, 2024

(30) Foreign Application Priority Data

Oct. 29, 2021 (GR) .............................. 20210100751

(51) Int. Cl.
*H04W 24/10* (2009.01)
*H04W 24/02* (2009.01)

(52) U.S. Cl.
CPC ........... *H04W 24/10* (2013.01); *H04W 24/02* (2013.01)

(58) Field of Classification Search
CPC .............................. H04W 24/02; H04W 24/10
(Continued)

(56) References Cited

U.S. PATENT DOCUMENTS 9,338,928 B2 5/2016 Lehman
10,180,261 B1 1/2019 Ross et al.
(Continued)

FOREIGN PATENT DOCUMENTS

CN 113255953 A 8/2021
EP 3849108 A1 * 7/2021 ............ H04W 24/04
(Continued)

OTHER PUBLICATIONS

International Search Report and Written Opinion mailed Sep. 28, 2022 in corresponding International Application No. PCT/EP2022/058154 (47 pages).

*Primary Examiner* — Sibte H Bukhari
(74) *Attorney, Agent, or Firm* — Rothwell, Figg, Ernst & Manbeck, P.C.

(57) ABSTRACT

A method for managing operational temperature conditions of one or more base stations being executed at a central computing device in a communication system is provided. The method includes acquiring initial operational parameters for each local computing device of a first group of local computing devices associated with the one or more base stations. The method further includes determining one or more clusters by grouping each local computing device of the first group of local computing devices under one of the
(Continued)

determined clusters based on the acquired operational parameters. The method further includes training, a central machine learning (ML) model for each determined cluster. The method further includes acquiring, for each local computing device of a second group of local computing devices associated with the one or more base stations, updated operational parameters. The method further includes computing an operational difference measure of the second group of local computing devices using the acquired updated operational parameters. The method further includes determining optimized operational temperature conditions to be transmitted to the second group of local computing devices by using distributed ML, in response to determining that the computed operational difference measure is less than a threshold value.

20 Claims, 14 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2017/0198933 A1 | 7/2017 | Erpelding et al. | |
| 2019/0368759 A1 | 12/2019 | Dempster et al. | |
| 2020/0012966 A1 * | 1/2020 | Nagaraju | G06F 11/3409 |
| 2020/0379417 A1 | 12/2020 | Zhang et al. | |
| 2021/0109584 A1 | 4/2021 | Bernat et al. | |
| 2024/0005069 A1 | 1/2024 | Zhao et al. | |

FOREIGN PATENT DOCUMENTS

| | | |
|---|---|---|
| WO | 2020/115273 A1 | 6/2020 |
| WO | 2020/261285 A1 | 12/2020 |
| WO | 2021/139892 A1 | 7/2021 |

* cited by examiner

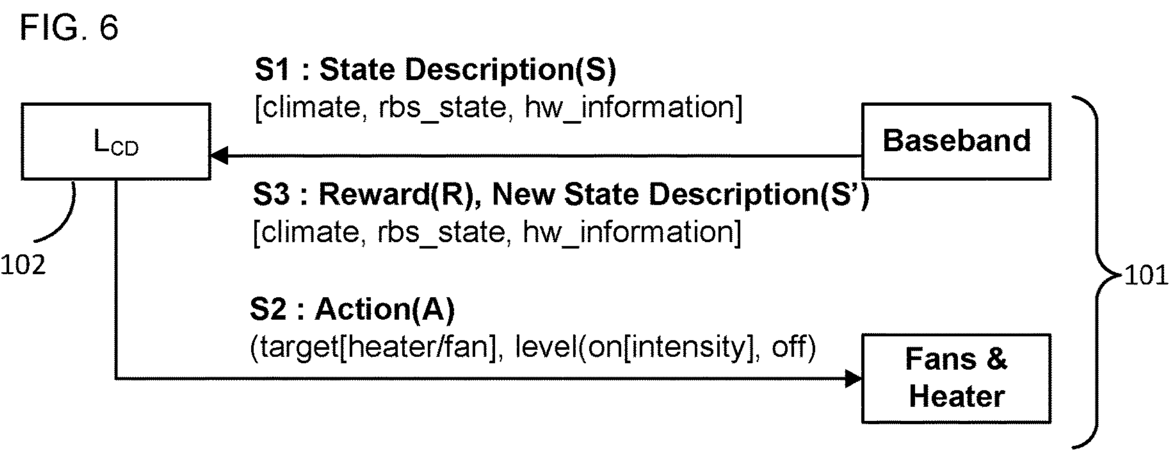
FIG. 6
S1 : State Description(S)
[climate, rbs_state, hw_information]
LCD
Baseband
S3 : Reward(R), New State Description(S')
[climate, rbs_state, hw_information]
102
101
S2 : Action(A)
(target[heater/fan], level(on[intensity], off)
Fans &
Heater

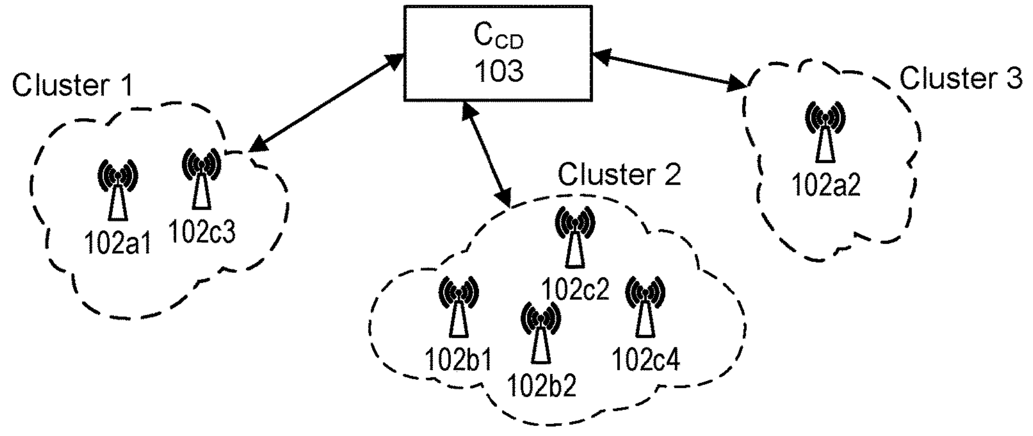
FIG. 7a Clustering
CCD
103
Cluster 1
Cluster 3
Cluster 2
102a1
102c3
102a2
102c2
102b1
102b2
102c4

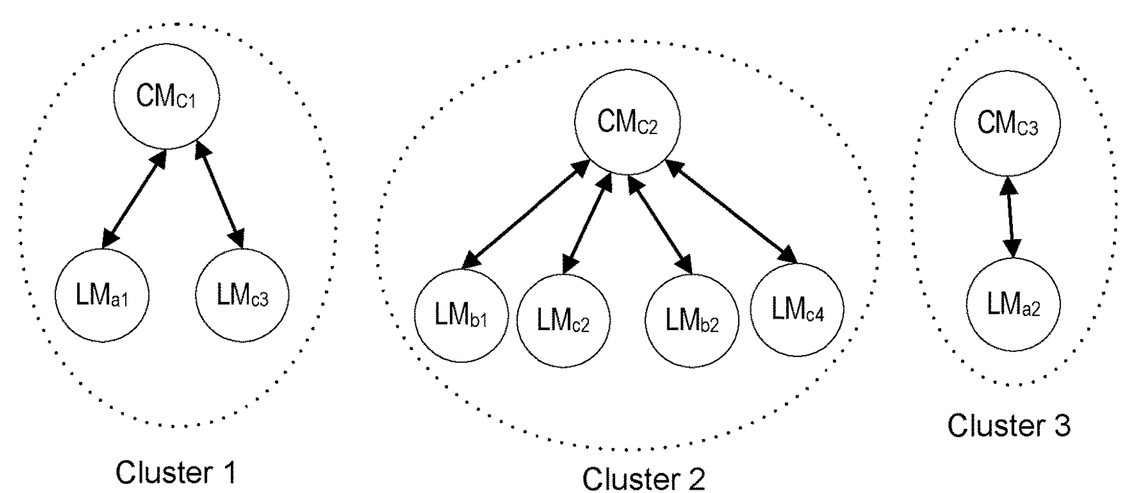
FIG. 7b Global ML models and Local ML models on Clustering
CMC1
CMC2
CMC3
LMa1
LMc3
LMb1
LMc2
LMb2
LMc4
LMa2
Cluster 1
Cluster 2
Cluster 3

FIG. 7c Regrouping of same set of devices
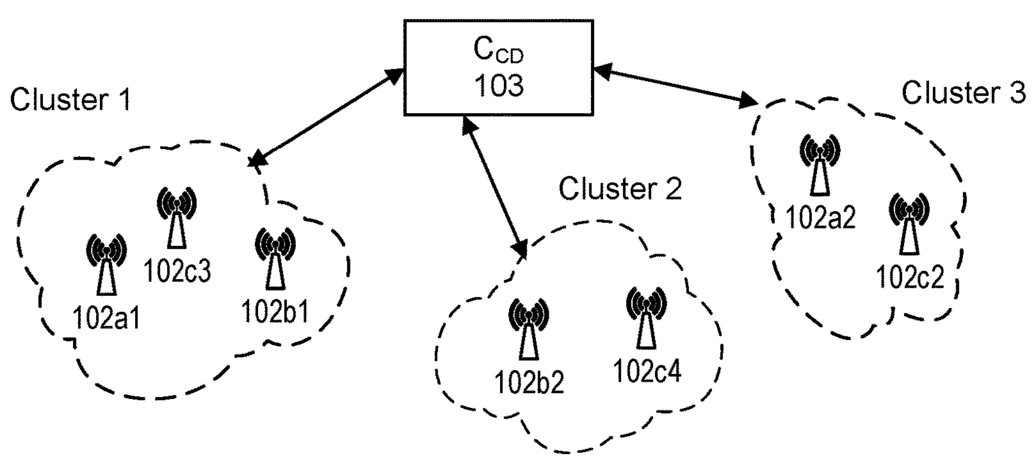
FIG. 7d Global ML models and Local ML models on regrouping of same set of devices
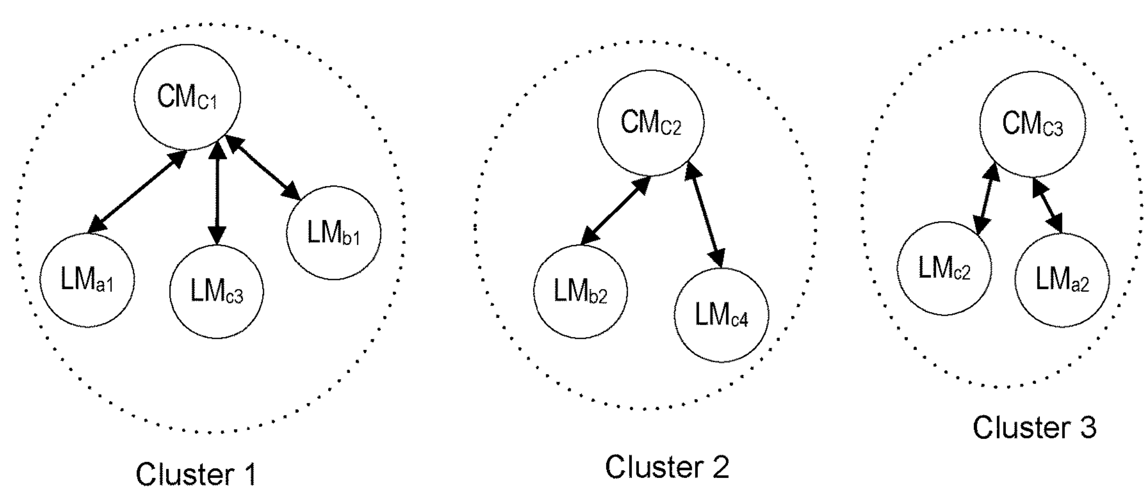

FIG. 7e Grouping of different set of devices
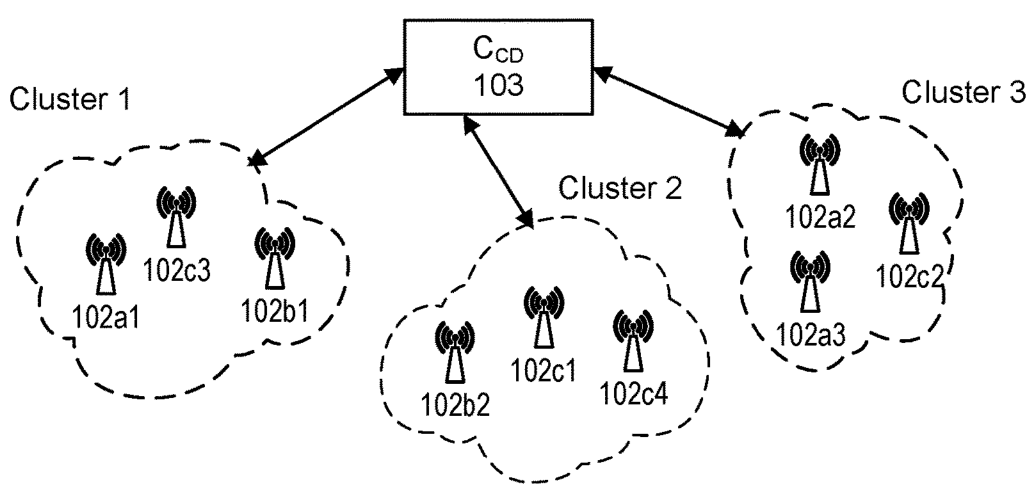
FIG. 7f Global ML models and Local ML models on grouping of diffferent set of devices
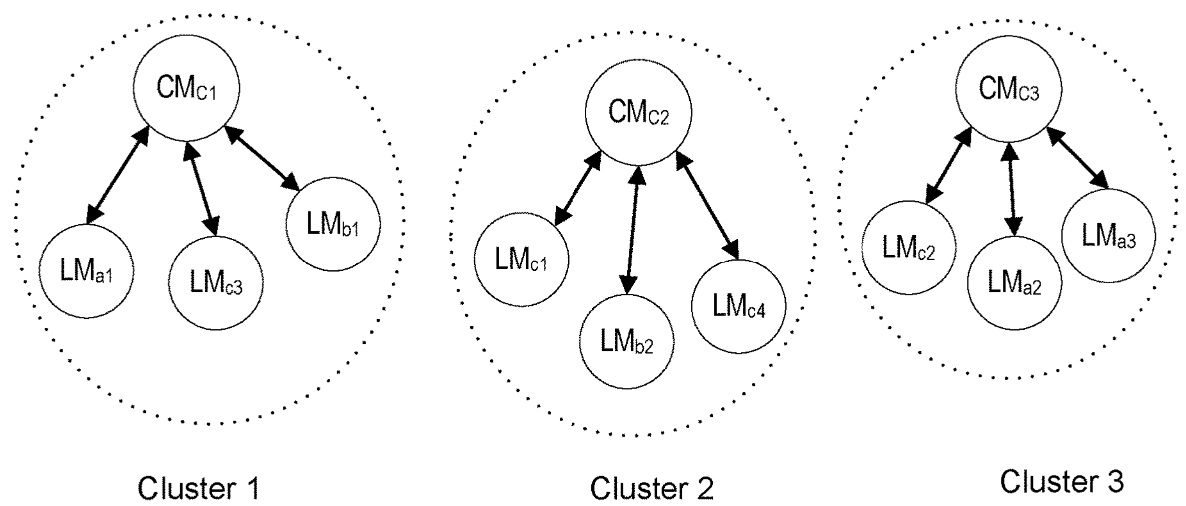

FIG. 7g Regrouping of different set of devices
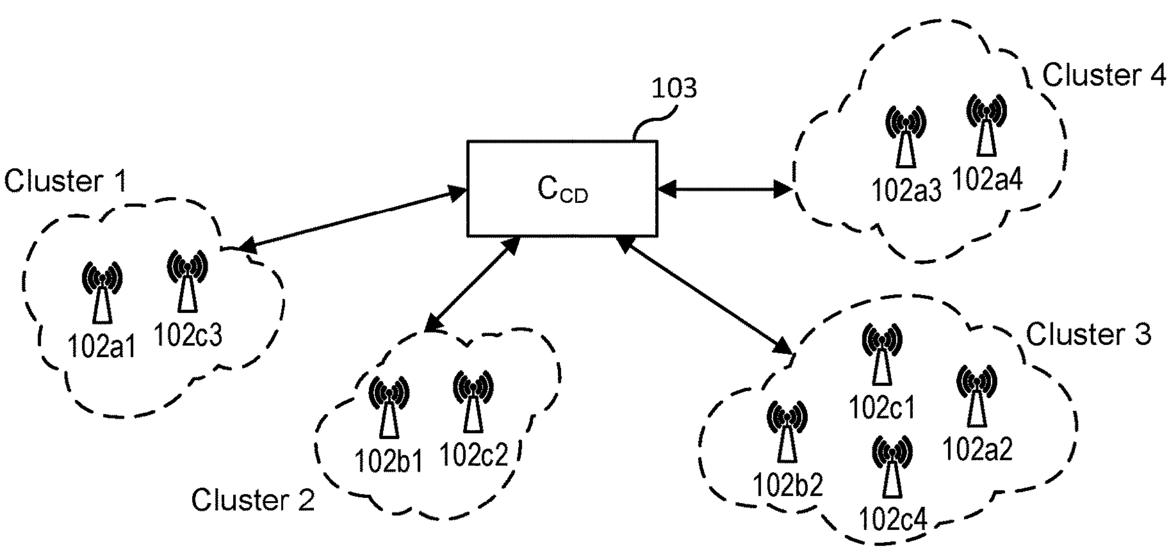
FIG. 7h Global ML models and Local ML models on regrouping of different set of devices
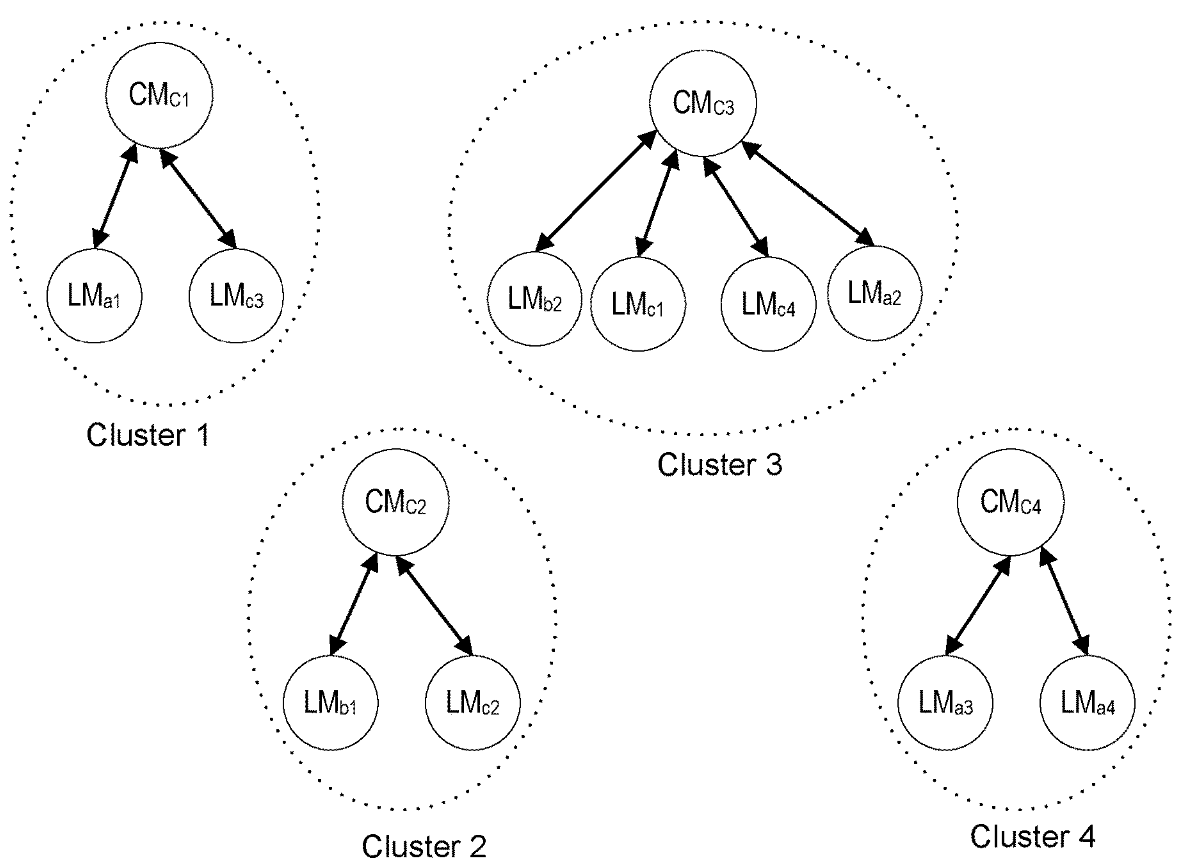

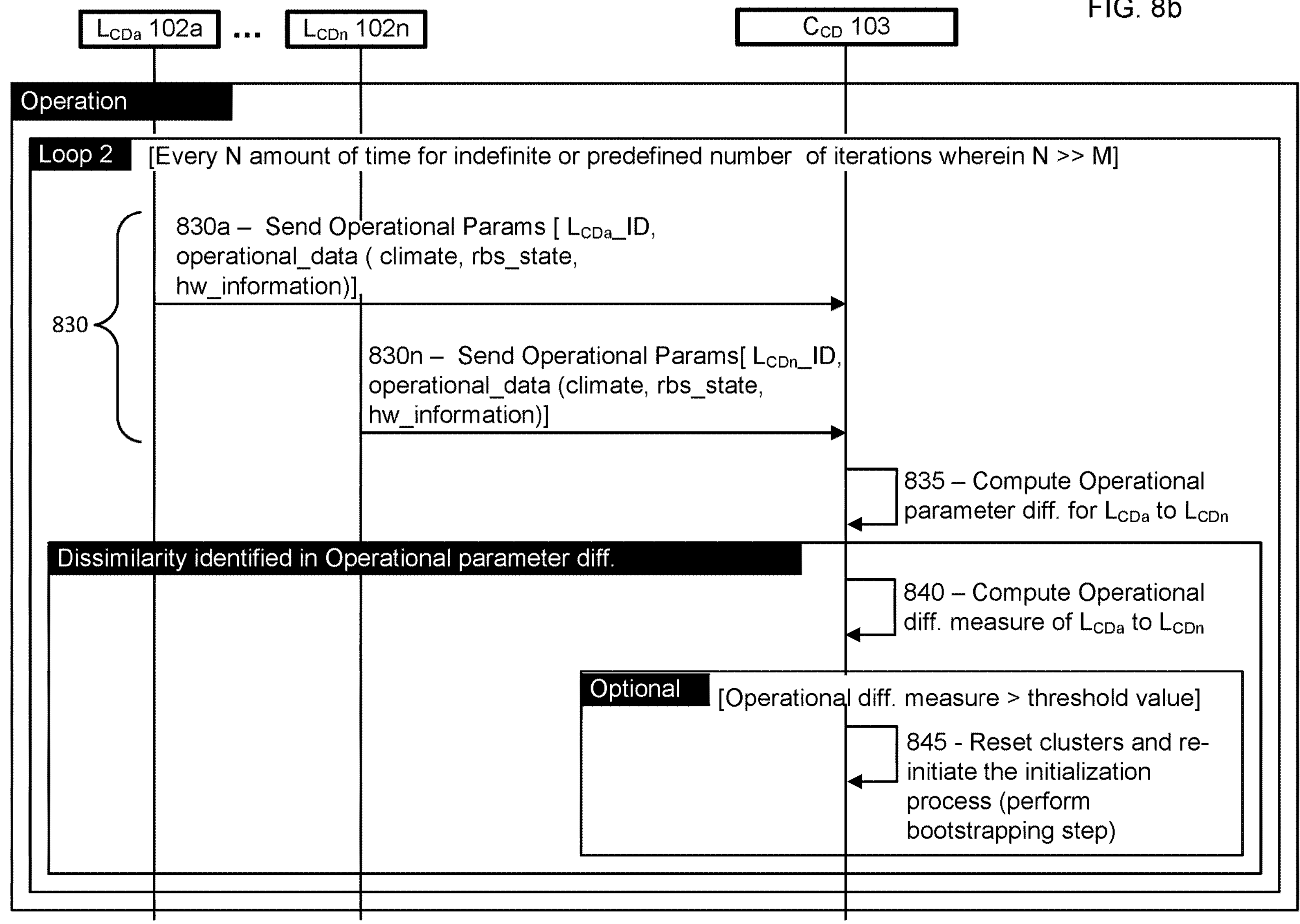

FIG. 8b
$L_{CDa}$ 102a
...
$L_{CDn}$ 102n
$C_{CD}$ 103
Operation
Loop 2
[Every N amount of time for indefinite or predefined number of iterations wherein N >> M]
830a – Send Operational Params [ $L_{CDa}$_ID, operational_data ( climate, rbs_state, hw_information)]
830
830n – Send Operational Params[ $L_{CDn}$_ID, operational_data (climate, rbs_state, hw_information)]
835 – Compute Operational parameter diff. for $L_{CDa}$ to $L_{CDn}$
Dissimilarity identified in Operational parameter diff.
840 – Compute Operational diff. measure of $L_{CDa}$ to $L_{CDn}$
Optional
[Operational diff. measure > threshold value]
845 - Reset clusters and re-initiate the initialization process (perform bootstrapping step)

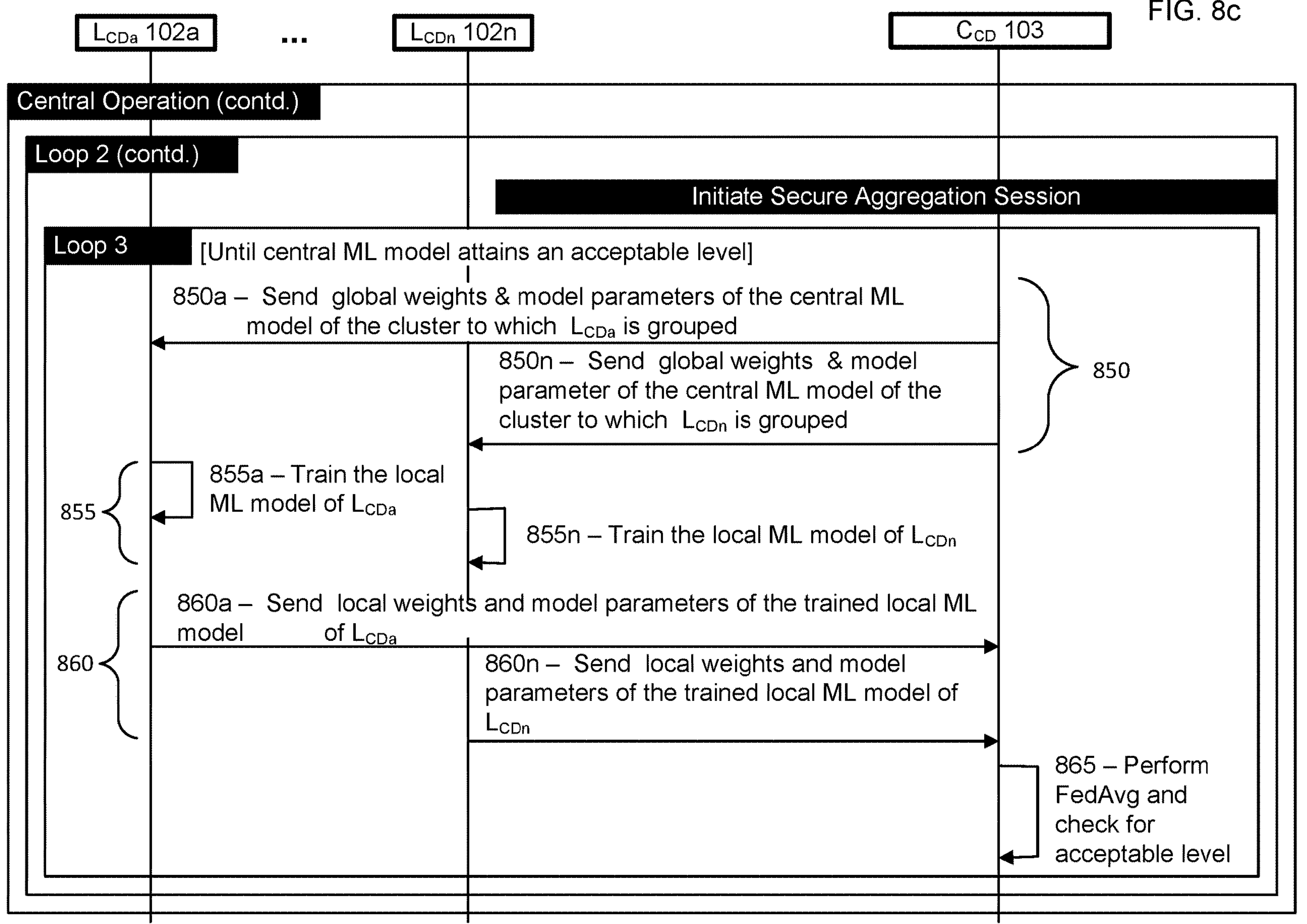

FIG. 8c
$L_{CDa}$ 102a
...
$L_{CDn}$ 102n
$C_{CD}$ 103
Central Operation (contd.)
Loop 2 (contd.)
Initiate Secure Aggregation Session
Loop 3
[Until central ML model attains an acceptable level]
850a – Send global weights & model parameters of the central ML model of the cluster to which $L_{CDa}$ is grouped
850n – Send global weights & model parameter of the central ML model of the cluster to which $L_{CDn}$ is grouped
850
855a – Train the local ML model of $L_{CDa}$
855n – Train the local ML model of $L_{CDn}$
855
860a – Send local weights and model parameters of the trained local ML model of $L_{CDa}$
860n – Send local weights and model parameters of the trained local ML model of $L_{CDn}$
860
865 – Perform FedAvg and check for acceptable level

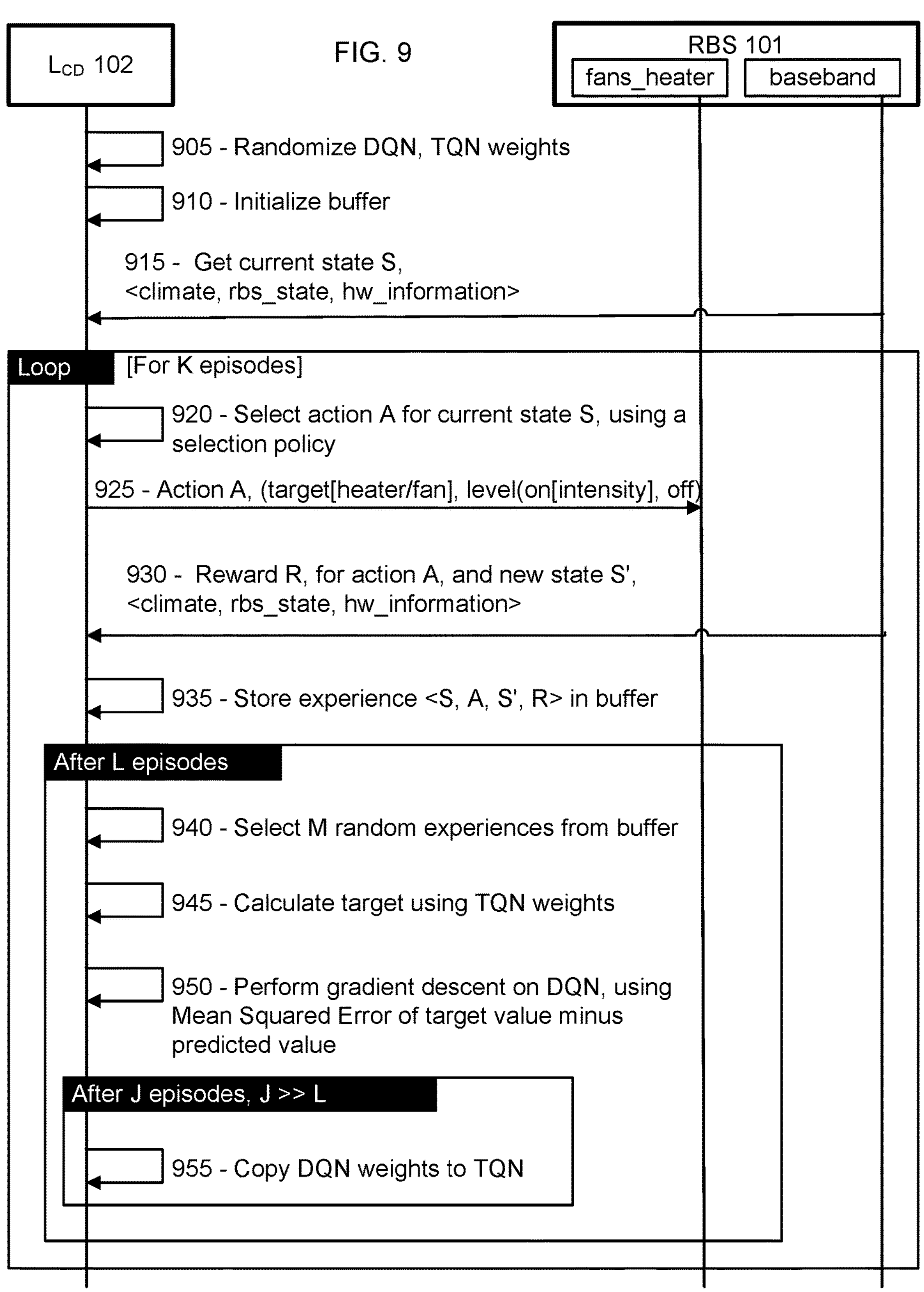

$L_{CD}$ 102
FIG. 9
RBS 101
fans_heater
baseband
905 - Randomize DQN, TQN weights
910 - Initialize buffer
915 - Get current state S, <climate, rbs_state, hw_information>
Loop
[For K episodes]
920 - Select action A for current state S, using a selection policy
925 - Action A, (target[heater/fan], level(on[intensity], off)
930 - Reward R, for action A, and new state S', <climate, rbs_state, hw_information>
935 - Store experience <S, A, S', R> in buffer
After L episodes
940 - Select M random experiences from buffer
945 - Calculate target using TQN weights
950 - Perform gradient descent on DQN, using Mean Squared Error of target value minus predicted value
After J episodes, J >> L
955 - Copy DQN weights to TQN $L_{CD}$ 102
COMMUNICATION INTERFACE 1022
PROCESSING CIRCUITRY 1024
MEMORY 1026
Computer Readable Medium 1028
Program 1029

$C_{CD}$ 103
COMMUNICATION INTERFACE 1032
PROCESSING CIRCUITRY 1034
MEMORY 1036
Computer Readable Medium 1038
Program 1039

METHOD AND SYSTEM FOR MANAGING OPERATIONAL TEMPERATURE OF BASE STATION

CROSS REFERENCE TO RELATED APPLICATION(S)

This application is a 35 U.S.C. § 371 National Stage of International Patent Application No. PCT/EP2022/058154, filed Mar. 28, 2022, designating the United States, which claims priority to Greece application Ser. No. 20/210,100751, filed Oct. 29, 2021, the disclosure of which is incorporated herein by reference in its entirety.

TECHNICAL FIELD

The invention relates to managing the operational temperature conditions of radio base stations. The invention relates to a method and computing devices for managing operational temperature conditions of one or more base stations in a communication system.

BACKGROUND

A radio base station typically comprises of equipment mounted on top of a radio tower such as radio units and antennas, and equipment placed in a radio base station cabinet on the bottom of the tower such as the baseband processor, data traffic switches, the power subsystem which power all the components, climate system etc. The different electronic components in the radio base station generate waste heat when in use. This heat energy must be removed to prevent overheating and subsequent malfunction. The climate system in a radio base station cabinet is used for controlling the temperature inside the radio base station and FIG. 1 shows one of the implementations of the climate system in the radio base station 101. The main parts of the climate system as illustrated in FIG. 1 generally comprise: (a) Climate Control Unit (CCU), (b) internal fans, (c) external fans, (d) heat exchangers, (e) heater and (f) temperature sensor. Some climate systems apart from the above-mentioned parts may also comprise—pressure detector, air filter unit, Support Pressure Meter, Support Extension Unit, Direct Air-Cooling system etc. The climate system controls the temperature inside the radio base station 101 by measuring the temperature using temperature sensors inside the radio base station, and if the temperature is outside a desired range (i.e., too cold, or too warm) then automatically adjusts the speed of the fans and/or the output signal to the heater to reach the desired temperature. For example, the heater will be activated by the CCU if the temperature sensor measures temperatures in the cabinet below a threshold value. The CCU will maximize output from the heater by running the fans at different speeds if the temperature continues to decrease after activation of the heater.

Currently, in most of the radio base stations, the climate system control is set up in a reactive way. It would be more efficient if the controlling is done in a proactive way by predicting the need for controlling the operational temperature based on different operational factors which affects the operational temperature of the radio base station. There are multiple affecting factors or parameters like environmental or climatic parameters, radio base station state factors, radio base station information about the hardware and/or software configuration etc. which causes variations in the operational temperature of the radio base station. In the current available systems, all the affecting factors are not considered effectively for managing the operational temperature conditions of radio base stations.

The radio base stations in which the climate system control has predictive approaches generally make use of machine learning (ML) wherein either independent ML models are trained separately for every radio base station, or an approach such as distributed ML is used to create a centralized ML model that would be able to capture all training details. The problem with the former approach is that a lot of compute power would be required in to train independent ML models. This would make scaling of ML approaches in distributed networks, such as mobile communication networks, computationally expensive. In addition, lifecycle management (LCM) of these ML models would be costly. While the latter centralized approach would be expensive, as data for training the ML models would have to be collected and verified independently; also, data security and privacy would be a concern as the different radio base stations could be operated by different mobile network operators, they would not prefer to share sensitive operational data of the radio base stations.

U.S. Ser. No. 10/180,261B1 describes about a method in a datacenter which uses control and prediction models to determine out which set of parameters reduce the amount of energy used. US20190368759A1 discloses about controlling energy consumption of a heating, ventilation, and air conditioning system through a building automation system.

However, even with the currently used and known reactive or predictive techniques managing the operational temperature conditions of Heating Ventilation and Air Conditioning (HVAC) systems, there is an absence of techniques that could be applied efficiently to distributed settings, such as for example, a mobile network wherein hundreds or thousands of radio base station cabinets are existing for different radio base stations operated by the same or different mobile network operators. There is a need for a new improvised system for managing the operational temperature conditions of radio base stations in a distributed communication system in a time-efficient and secure manner.

SUMMARY

It is an object of embodiments herein to address at least some of the limitations, problems and issues outlined above. More specifically, it is an object of the invention to provide methods and computing devices for managing operational temperature conditions of one or more base stations in a communication system in a time-efficient and secure manner.

These and other objects of embodiments herein are achieved by means of different aspects of the disclosure, as defined by the independent claims. Embodiments of the disclosure are characterized by the dependent claims.

According to a first aspect of embodiments herein, a method for managing operational temperature conditions of one or more base stations in a communication system is provided. The method is being executed at a central computing device in the communication system. The method includes acquiring, for each local computing device of a first group of local computing devices associated with the one or more base stations, initial operational parameters. The method further includes determining one or more clusters by grouping each local computing device of the first group of local computing devices under one of the determined clusters based on the acquired initial operational parameters. The method further includes training a central ML model for each determined cluster. The method further includes acquiring, for each local computing device of a second group of local computing devices associated with the one or more base stations, updated operational parameters. The method further includes computing an operational difference measure of the second group of local computing devices using the acquired updated operational parameters. The method further includes determining optimized operational temperature conditions to be transmitted to the second group of local computing devices by using distributed ML, in response to determining that the computed operational difference measure is less than a threshold value. By using distributed ML, the weights of the local ML models associated with the different radio base stations are only shared with the central computing device instead of the training data associated with the radio base stations. So, different mobile network operators do not have to share sensitive operational data i.e., the training data. The use of secure aggregation also allows the transfer of the weights securely and anonymously which adds further security to the privacy protection of operational data shared by mobile network operators. The information data i.e., the weights of the local ML models received from different radio base stations are aggregated centrally which helps in improving the training of the central ML models which in turn improves the quality and accuracy of the local ML models used for managing operational temperature conditions of radio base stations provided by multiple mobile network operators. This also helps in increasing the energy efficiency of climate systems. Thus, by using distributed ML such as for e.g., Federated Learning (FL) along with secure aggregation of the ML models, the method enables managing operational temperature conditions of radio base stations provided by multiple mobile network operators in a secure and efficient manner.

According to a second aspect of embodiments herein, a method for managing operational temperature conditions of a base station in a communication system is provided. The method is being executed at a local computing device in the communication system. The method includes acquiring from a central computing device, weights and model parameters of a central ML model. The method further includes training a local ML model using the acquired weights and model parameters of the central ML model and base station specific data wherein, ML is utilized for training the local ML model and the base station specific data comprises property measurements of one or more properties affecting the operational temperature conditions of the base station. The method further includes transmitting to the central computing device, weights and model parameters of the trained local ML model. The method further includes transmitting to the central computing device, operational parameters generated based on the base station specific data. The method further includes determining optimized operational temperature conditions to be applied to the base station using the trained local ML model. The training of the local ML model locally in the base station using the weights and model parameters of the central ML model and base station specific data, provides the advantages of reduced model LCM costs as it scales among multiple base stations, reduced computational requirements, as well as data transport requirements. The method enables granular control over temperature of the different hardware of the base station which helps in increasing its durability and lifetime.

According to a third aspect of embodiments herein, a central computing device in a communication system configured for managing operational temperature conditions of one or more base stations in the communication system is provided, the central computing device comprises at least one processor; at least one memory connected to the at least one processor and storing program code that is executed by the at least one processor. The central computing device is configured to acquire, for each local computing device of a first group of local computing devices associated with the one or more base stations, initial operational parameters. The central computing device is further configured to determine one or more clusters by grouping each local computing device of the first group of local computing devices under one of the determined clusters based on the acquired operational parameters. The central computing device is further configured to train a central ML model for each determined cluster. The central computing device is further configured to acquire, for each local computing device of a second group of local computing devices associated with the one or more base stations, updated operational parameters. The central computing device is further configured to compute an operational difference measure of the second group of local computing devices using the acquired updated operational parameters. The central computing device is further configured to determine optimized operational temperature conditions to be transmitted to the second group of local computing devices by using distributed ML, in response to determining that the computed operational difference measure is less than a threshold value.

According to a fourth aspect of embodiments herein, a local computing device in a communication system configured for managing operational temperature conditions of a base station in the communication system is provided, the local computing device comprises at least one processor; at least one memory connected to the at least one processor and storing program code that is executed by the at least one processor. The local computing device is configured to acquire from a central computing device, weights and model parameters of a central ML model. The local computing device is further configured to train a local ML model using the acquired weights and model parameters of the central ML model and base station specific data wherein, ML is utilized for training the local ML model and the base station specific data comprises property measurements of one or more properties affecting the operational temperature conditions of the base station. The local computing device is further configured to transmit to the central computing device, weights and model parameters of the trained local ML model. The local computing device is further configured to transmit to the central computing device, operational parameters generated based on the base station specific data. The local computing device is further configured to determine optimized operational temperature conditions to be applied to the base station, using the trained local ML model.

According to a fifth aspect of embodiments herein a computer-readable medium is provided, comprising instructions which when executed on a computer, cause the computer to perform the method of any one of the embodiments of the first aspect.

According to a sixth aspect of embodiments herein a computer-readable medium is provided, comprising instructions which when executed on a computer, cause the computer to perform the method of any one of the embodiments of the second aspect.

BRIEF DESCRIPTION OF THE DRAWINGS

The invention will now be described in more detail by means of some example embodiments and with reference to the accompanying drawings, in which:

FIG. 6 is a schematic diagram of an example of a RL training process applied in a local computing device FIG. 7*a*-7*h* shows schematic illustrations of clustering and re-clustering of local computing devices and ML models according to embodiments herein;

FIG. 8*a*-8*c* shows sequence diagrams depicting a method performed in a communication system according to embodiments herein;

FIG. 9 is a sequence diagram depicting a method performed in a communication system according to embodiments herein;

DETAILED DESCRIPTION

The invention will now be described more fully hereinafter with reference to the accompanying drawings, in which certain embodiments of the invention are shown. However, other embodiments in many different forms are possible within the scope of the present disclosure and should not be construed as limiting. Rather, the following embodiments are provided by way of example so that this disclosure will be thorough and complete, and will fully convey the scope of the disclosure to those skilled in the art. Like numbers refer to like elements throughout the description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more computing devices or nodes using hardware circuitry (e.g., analog and/or discrete logic gates interconnected to perform a specialized function, ASICs, PLAs, etc.) and/or using software programs and data in conjunction with one or more digital microprocessors or general-purpose computers. Computing devices or nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

The terms such as "first" and "second" as used herein may use corresponding components regardless of importance or an order and are used to distinguish a component from another without limiting the components. These terms may be used for the purpose of distinguishing one element from another element. For example, a first group and a second group indicate different groups regardless of the order or importance.

Figure 1:
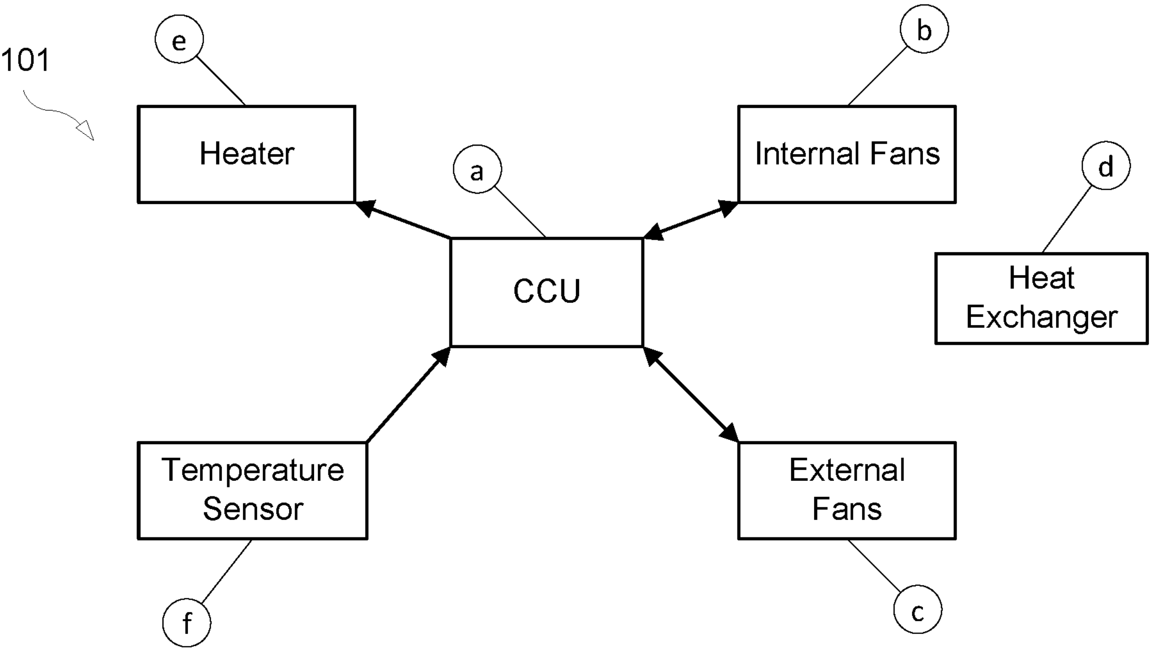
FIG. 1 show an example of radio base station cabinet components.
Figure 2A:
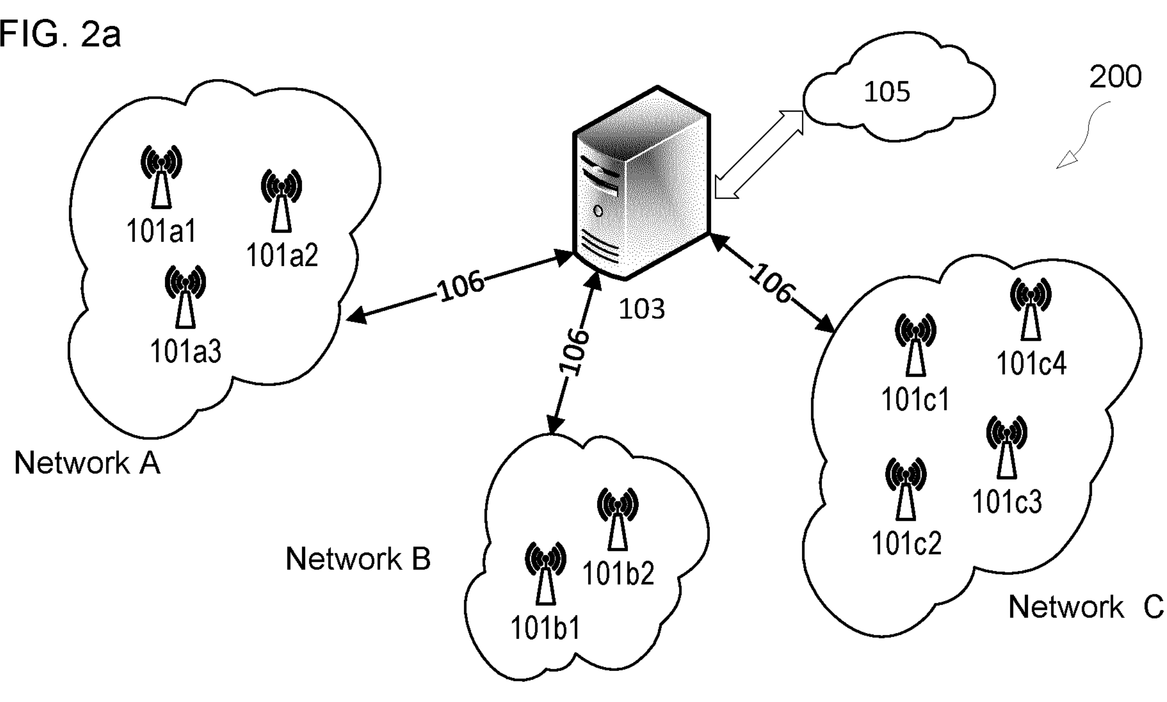
FIG. 2*a* & 2*b* show examples of a schematic overview depicting a communication system for managing operational temperature conditions of one or more base stations in the communication system according to a deployment of embodiments herein.
Figure 2B:
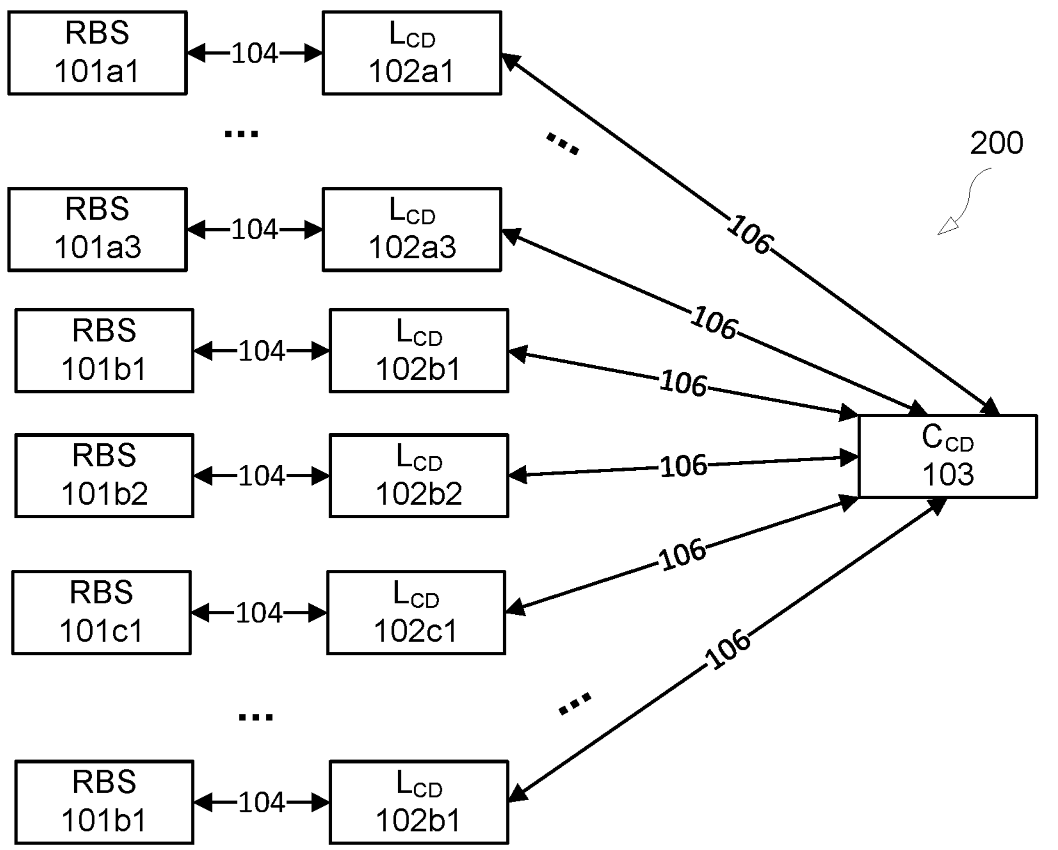

FIG. 2*a* and FIG. 2*b* (collectively referred to as FIG. 2) shows a schematic illustration of a communication system 200 where embodiments presented herein may be applied for predictive, ML based HVAC system control of radio base station cabinets. The communication system 200 of FIG. 2 comprises: three networks—Network A, Network B and Network C; a plurality of radio base stations 101*a*1, 101*a*2, 101*a*3, 101*b*1, 101*b*2, 101*c*1, 101*c*2, 101*c*3 and 101*c*4. (collectively referred to using the reference sign 101) operating in one of the three networks, for which the operational temperature conditions are to be managed; a plurality of local computing devices 102*a*1, 102*a*2, 102*a*3, 102*b*1, 102*b*2, 102*c*1, 102*c*2, 102*c*3 and 102*c*4. (collectively referred to using the reference sign 102), wherein each local computing device 102 is associated with a radio base station 101; and a global computing device 103, which is in communication with the plurality of radio base stations 101 through the local computing devices 102. The communication system 200 of FIG. 2A and FIG. 2B, show nine radio base stations 101 and nine associated local computing devices 102 which are operating in any one of the three networks—Network A, Network B and Network C; those skilled in the art will appreciate that larger or smaller numbers of radio base stations, local computing devices and networks may be used.

The communication system 200 shown in FIG. 2 is suitable for implementing and executing the embodiments presented herein for managing operational temperature conditions of one or more base stations 101 in the communication system 200 and will be explained in more detail below.

The communication system 200 of FIG. 2 may form part of a wireless communication network such as a 3rd Generation Partnership Project (3GPP), 4th Generation (4G) or 5th Generation (5G) network. The communication system 200 may comprise a single network or more than one networks which could be provided by the same mobile network operators or different mobile network operators. So, the different networks—Network A, Network B and Network C shown in FIG. 2*a* containing the plurality of radio base stations 101 could be operated by same or different mobile network operators. The radio base stations 101, hereinafter referred as base stations, for example may be 4th Generation, 4G, Evolved Node Base station, eNB, or 5th Generation, 5G, next Generation Node Base station, gNBs.

As illustrated in FIG. 2*b*, each of the base stations 101 have a local computing device 102 associated with it. The local computing device 102 can be a functional component deployed in the corresponding base station 101, for example, the local computing device 102 can be part of the CCU of the climate system or baseband unit of the base station 101. Also, the local computing device 102 can be deployed as a separate network node of the communication network or as a logical functional component in other network nodes of the communication network, for example, the Operations Support System (OSS) of the mobile network operator's network or hosted by third-party cloud providers 105, etc. The local computing device 102 and the corresponding base station 101 communicate with one another using suitable communication means 104, such as a wireless communications system, wired communications system, and so on. As shown in FIG. 2, all the base stations 101 are connected to a central computing device 103 via its associated local computing device 102. The local computing device 102 can receive information from the different sensors and other components of the corresponding base station 101, also receive information from the central computing device 103. The local computing device 102 is configured to host a local ML model which is trained using the information received from the corresponding base station 101 and the central computing device 103 by applying ML techniques like reinforcement learning (RL), Deep-Q RL etc. The trained local ML model is then applied to predict and plan when and how to actuate the fans and the heater element of the base station 101 to manage the operational temperature conditions of the base station 101 in an optimal and efficient manner.

As shown in FIG. 2*b*, the central computing device 103 is in communication with one or more base stations 101 via the local computing devices 102. The central computing device 103 may include a server device, cloud server or the like which may form part of a Core Network Node of the communication system 200. The central computing device 102 can be deployed as a separate network node of the communication network or as a logical functional component in other network nodes of the communication network, for example, the OSS of the mobile network operator's network or hosted by third-party cloud providers 105, etc. In some embodiments the central computing device 103 and local computing devices 102 may be co-located, that is, may be contained within the same network node or device of the communication system 200. However, typically the central computing device 103 and local computing devices 102 are located separately from one another located in suitable components of the network and communicate with one another using a suitable communication means 106 such as a wireless communications system, wired communications system, and so on. While a single central computing device 103 is shown in FIG. 2, the functionality of central computing device 103 may be distributed across multiple network nodes, computing devices and/or servers, and may be shared between one or more of the local computing devices 102. Some communication systems may also incorporate plural central computing devices 103, which may be of particular use when managing very complex environments. The central computing device 103 is configured to host central ML models which are trained using the information received from the plurality of local computing devices 102 by applying distributed ML techniques like clustering, FL with secure aggregation etc. The trained central ML models in the central computing device 103 then transmit the information to the corresponding local ML models of the local computing devices 102, that information is then used to train the local ML model to facilitate in managing the operational temperature conditions of the base station 101 in a secure and time-efficient manner.

As mentioned before, the known reactive or predictive solutions for managing the operational temperature conditions of the HVAC systems could not be applied efficiently to distributed settings such as for mobile network wherein hundreds or thousands of base station cabinets are existing for different base stations 101. Of the plurality of the base stations 101 in the communication system 200, some would be of the same characteristics or type, while many would be of different characteristics or features. So, it would not be feasible to apply a single ML model to manage the operational temperature conditions of all the base stations 101 in the communication system 200. Also, it would be difficult and costly to train and maintain a separate individual ML model for each base station 101, also the training data and information from the single base station would not be able to provide sufficient quality data for ML model training. A separate individual ML model would not be able to make use of the knowledge or learnings of different conditions and factors that affect the operational temperature conditions of the other base stations 101. As these base stations 101 could belong to different networks or same networks which could be operated by same or different mobile network operators in the communication system 200, the network operators would not prefer to share sensitive operational data in order to maintain the privacy. Thus, there is need for a predictive distributed secure ML solution which could efficiently couple the knowledge or learnings of different conditions and factors that affect the operational temperature conditions of the plurality of base stations 101 in the communication system 200 and apply it optimally for managing the temperature inside a base station 101. There are multiple factors that affect the temperature in a base station 101. The one or more properties or factors affecting the operational temperature conditions of a base station 101 comprise at least one or more of: -: (i) environmental or climatic factors, (ii) state factors, (iii) information about the hardware and/or software configuration and so on as explained in detail later. As explained earlier, the climate system controls the temperature inside the base station 101 by measuring the temperature using temperature sensors present within the base station 101. If the measured temperature is outside a desired range (i.e., too cold, or too warm) then the climate system automatically adjusts the operating speed of the fans and the output signal to the heater to make the inside the base station 101 to reach the desired temperature. There is a need for a solution to predict and plan in advance how to control efficiently the temperature inside the base station 101 at real-time, based on the different properties or factors affecting the operational temperature conditions of a base station So, all the affecting factors needs to be considered individually or in conjunction to identify or predict parameters to be adjusted for managing the operational temperature conditions of base stations 101. This predicted information can then be used to control the functioning of the climate system in an optimal manner, such that fans and the heater may be controlled in a granular fashion. For example, the operating speed of the fans can be adjusted by increasing or reducing it, or completely turning it off in advance to save energy. The same applies to the heating element in the cabinet that can be used to warm up the cabinet based on a predicted future need. The use of predictive information to control the functioning of the climate system helps in improving the functioning of the base stations and as well as the increasing longevity of the different components in the base station as well as the base station in whole.

A hybrid distributed type of predictive ML based HVAC control system is used in the proposed disclosure (methods 300, 500 and communication system 200) for managing the operational temperature conditions of the base stations 101 in an optimal and time-efficient manner. The proposed communication system 200 in this disclosure is operating the methods 300 and 500 using the different components mainly at two levels i.e., (i) the central or macro level, and (ii) the local or micro level. The central or macro level corresponds to the different operations performed mainly at the central computing device 103 which is in communication with all the base stations 101 in the communication system 200 via its associated local computing device 102. The local or micro level corresponds to the different operations performed mainly at the local computing device 102 associated with each of the plurality of base stations 101 part of the same or different networks in the communication system 200.

At the central or macro level, the central computing device 103 is in communication with a plurality of base stations 101 in the communication system 200 via the local computing device 102 associated with each base station 101. The central computing device 103 functions in two phases—(i) initialization or bootstrapping phase, and (ii) operation phase.

In the initialization or bootstrapping phase, first the central computing device 103 would establish communication with a first group of local computing devices associated with the plurality of base stations 101. After establishing communication, the central computing device 103 would acquire initial operational parameters (referred as the operational parameters in general) from each local computing device 102. As described earlier, each base station 101 in the communication system 200 would have a local computing device 102 associated with it. So, the first group of local computing devices would be referring to a first group of base stations 101 belonging to the same and/or different operator networks in the communication system 200. The first group of local computing devices may include all the base stations 101 operating in the communication system 200 or it may include some of the base stations 101 operating in the communication system 200 for example some of the base stations may not be functional or faulty and would not be communicating with the central computing device 103. The operational parameters may be acquired from the local computing device 102 by the central computing device 103 periodically or on request. The periodic time interval may be a configurable value based on the functioning requirements of the communication system 200.

The operational parameters of a local computing device 102 is a serialized data structure comprising property measurements of one or more properties affecting the operational temperature conditions of the corresponding base station 101. The properties affecting the operational temperature conditions of a base station 101 comprise at least one or more of:

- environmental or climatic factors, such as ambient temperature experienced by the base station, internal temperature of the base station, ambient humidity level recorded at the base station, internal humidity level recorded in the base station, pressure variations recorded at the base station, level of airflow recorded at the base station, latitude/longitude of the base station location etc.;
- state factors indicating the current load of the base station, such as number of active user equipment (UEs), Physical Resource Block (PRB) utilization, total aggregate throughput on uplink and downlink of the base station, future predicted load of the base station etc.;
- information about the hardware and/or software installed in the base station such as hardware configuration, the model type and software revision of all components in the cabinet, the cabinet type, etc.; and so on.

The property measurements of one or more affecting properties are obtained from the different sensors and other components of the base station 101, such as for e.g., temperature sensors, pressure sensor, operating system monitors, load analyzer etc. The obtained property measurements are generally provided by the baseband unit of the base station 101 to the local computing device 102. The operational parameters may comprise the property measurements of one or more affecting properties obtained at that time instant. The operational parameters may also be created in the local computing device 102 by averaging the property measurements provided by the baseband unit to the local computing device 102 over a period of time. The operational parameters of the local computing device are like a unique climate signature of the local computing device 102 i.e., the associated base station 101. The climate signature i.e., operational parameters may comprise a unique identifier which is typically used by the central computing device 103 for identifying the local computing device 102 which is sending the operational parameters. The operational parameters may be transmitted in any suitable format to the central computing device 103; an example of a suitable format is as an output vector, with different properties forming different fields or features of the vector, an illustration is given below:

Operational Parameters=[$L_{CD}$_ID, operational_data(<climate>, <rbs_state>, <hw_information>); wherein $L_{CD}$_ID is a unique identifier associated with each local computing device and operational_data contains the property measurements of the different properties of the base station.

The central computing device 103 would continue the process of acquiring the operational parameters from the first group of local computing devices preferably until sufficient information is acquired. The central computing device 103 may acquire multiple sets of operational parameters for a local computing device 102 and then averaging of the multiple sets may be done to determine the operational parameters for that local computing device 102. When the central computing device 103 acquires at least one set of operational parameters from all the local computing devices 102 of the first group of local computing devices then information may be considered to be sufficient.

After acquiring the sufficient operational parameters, the central computing device 103 may apply a clustering algorithm to determine one or more clusters by grouping each local computing device 102 of the first group of local computing devices under one of the clusters. The grouping of the local computing devices 102 under one of the clusters may be done based on the acquired operational parameters. The determining of one or more clusters is performed using any one of the clustering algorithms like K-means clustering, hierarchical clustering, K-medoids, Density-Based Spatial Clustering of Applications with Noise (DBSCAN), Gaussian Mixture Model (GMM) or K-Nearest Neighbor (KNN). The grouping of each local computing device 102 of the first group of local computing devices under each identified cluster is done based on similarity measure of the acquired operational parameters of the local computing device 102.

For each of the determined cluster, a central ML model is created. In the present context, we assume that an ML model is implemented using an artificial neural network (ANN), consisting of interconnected neurons, each neuron having weights representing the strength of its connection to other neurons. In some embodiments, a central ML model is any one of the following ANNs: a multi-layer perceptron such as a convolutional neural network (CNN), a recurrent neural network (RNN), such as a Long-Short Term Memory network (LSTM) etc. The central ML models created for each cluster are then trained wherein the weights of each central ML model are initialized i.e., typically weights are set to random values. However, in some embodiments the weights may be set to non-generic values, for e.g., pre-trained weights are provided from a baseline ML model which is trained using supervised learning on a generic dataset created in a lab setting or controlled environment. Every weight is typically represented by a number, such as a normalized float number from 0 to 1. Later during operation phase, typically the weights and model parameters of a trained local ML model from each of the local computing devices 102 grouped under each determined cluster is used for training the central ML model which is explained later in detail below. The configuration of every central ML model, in terms of hyperparameters (number of layers, number of neurons per layer, activation functions, etc.) is the same as to those of the local ML models associated with the corresponding cluster.

In FIG. 7*a*-7*h*, schematic illustration of the clustering of the local computing devices and ML models for some of the different scenarios are shown which will be now explained with reference to FIG. 2. As explained above, the different base stations 101 shown in FIG. 2 are in communication with the central computing device 103 through its associated local computing device 102. In FIG. 7*a*, there are three clusters—Cluster 1, Cluster 2 and Cluster 3 shown as created in the central computing device 103, the clusters comprise the local computing devices —102*a*1, 102*a*2, 102*b*1, 102*b*2, 102*c*2, 102*c*3 and 102*c*4 which corresponds to the first group of local computing devices. It can be seen that all the local computing devices 102 of the base stations 101 operating in the different networks—Network A, Network B and Network C, in the communication system 200 are not part of the first group of local computing devices i.e., 102*a*3 and 102*c*1. As explained earlier, the first group of local computing devices may include all the base stations 101 operating in the communication system 200 which is not covered in this illustration. The different clusters—Cluster 1, Cluster 2 and Cluster 3, are determined by grouping each of the local computing device 102 of the first group of local computing devices under one of the clusters based on the operational parameters of each local computing device 102. In FIG. 7*a*, it is shown that Cluster 1 comprises the grouping of 102*a*1 and 102*c*3; Cluster 2 comprises the grouping of 102*b*1, 102*b*2, 102*c*2 and 102*c*4; and Cluster 3 comprises the grouping of 102*a*2. In FIG. 7*b*, it is shown how a central ML model ($CM_{C1}$, $CM_{C2}$, $CM_{C3}$) is created for each of the three clusters separately and the different local ML models of the local computing devices 102 grouped under each cluster are used for training the central ML model. As illustrated in FIG. 7*b*, $LMa_1$ and $LM_{c3}$ are used for training $CM_{c1}$; $LM_{b1}$, $LM_{b2}$, $LM_{c3}$ and $LM_{c4}$ are used for training $CM_{c2}$; and $LM_{a2}$ is used for training $CM_{c3}$.

The central computing device 103 then moves to the operation phase after the completion of the initialization or bootstrapping phase. The below-mentioned process steps in the operation phase of the central computing device 103 are executed repetitively at periodic time intervals for either indefinite iterations or several predefined number of iterations wherein, the time intervals and the predefined number for iteration count may be a configurable value based on the functioning requirements of the communication system 200. After the below-mentioned process steps in the operation phase of the central computing device 103 are executed repetitively for the predefined number of iterations, a check is performed to determine whether the trained central ML model maintains an acceptable level of performance i.e. for e.g. ascertain whether the predictions provided by the central ML model are accurate or not. If the performance of the trained central ML model is below an acceptable level, then the central computing device 103 may be deactivated and retrained using known ML techniques to find the issue(s). Then, after retraining is completed the initialization process may be performed.

In the operation phase, for each iteration, first the central computing device 103 would acquire updated operational parameters (referred as the operational parameters in general) for each local computing device 102 of a next group of local computing devices associated with the plurality of base stations 101. For example, a second group of local computing devices corresponds to the next group of local computing devices and the first group of local computing devices considered during initialization corresponds to the previous group of local computing devices. Here, either: (i) all the local computing devices 102 of the next or second group of local computing devices are same as the local computing devices 102 of the previous or first group of local computing devices; or (ii) one or more of the local computing devices 102 of the next or second group of local computing devices are different from the local computing devices 102 of the previous or first group of local computing devices.

We would now describe in detail with reference to FIG. 2, 7*a*-*h*, about the different operations performed in the central computing device 103 when either of both conditions identified above occurs i.e., the second or next group of local computing devices is same as the first or previous group of local computing devices, or the second or next group of local computing devices is different from the first or previous group of local computing devices.

Consider the first scenario when the second or next group of local computing devices 102 is same as the first or previous group of local computing devices 102. FIG. 7*a* now corresponds to a scenario, the second or next group of local computing devices is same as the first or previous group of local computing devices i.e., the same local computing devices 102 which were in communication with the central computing device 103 during the initialization or bootstrapping phase is still in communication with the central computing device 103. So, the clusters comprising the central ML models would be also remaining the same as that was determined during the initialization or bootstrapping phase. After acquiring the updated operational parameters of the second or next group of local computing devices, an operational difference measure is computed. For computing the operational difference measure, first an operational parameters difference is determined for each local computing device 102 of the second or next group of local computing devices by comparing the acquired updated operational parameters with the previous operational parameters of each local computing device 102. For determining the operational parameters difference of a local computing device 102, at least one previous operational parameters of the local computing device 102 should be available in the central computing device 103. Typically, techniques like cosine similarity etc. are applied for determining the operational parameters difference between the acquired updated operational parameters and the previous operational parameters of each local computing device 102. Using the determined operational parameters difference, the operational difference measure of the second or next group of local computing devices 102 is computed. The operational difference measure is used for determining whether there is a significant difference or variation between the updated operational parameters and the previous operational parameters for a number of local computing devices 102 of the second or next group of local computing devices. The operational difference measure is typically determined using an entropy metric, which can be considered a normalized value from 0 to 1. For example, if the traffic load of a base station changes drastically and/or there are significant changes in temperature measured and humidity recorded in the base station, then the entropy value is increased by an amount towards one.

If there is not much difference or variation in the operational parameters, such that the computed operational difference measure is below a threshold value, then the central computing device 103 proceeds with the operation of determining the optimized operational temperature conditions which are to be transmitted to the second group of local computing devices 102 in turn to be applied to the associated base stations 101, wherein distributed ML such as for e.g., FL with secure aggregation is used for determining the optimized operational temperature conditions. For example, if there is only trivial variation in the operational parameters for less than 15% of the local computing devices 102 of the second or next group of local computing devices and the threshold value is configured as greater or equal to 0.6, then the computed operational difference measure would be below the threshold value, so existing clusters would be retained. The threshold value with which the operational difference measure is compared is typically a configurable variable value selectable between 0 and 1. The three clusters and the groupings of local computing devices as shown in FIG. 7*a* would be retained i.e., Cluster 1 comprises the grouping of 102*a*1 and 102*c*3; Cluster 2 comprises the grouping of 102*b*1, 102*b*2, 102*c*2 and 102*c*4; and Cluster 3 comprises the grouping of 102*a*2. Then, distributed ML such as for e.g., FL with secure aggregation is applied to the three different clusters as shown in FIG. 7*b*, wherein the different local ML models of the local computing devices 102 grouped under each cluster are used for training the central ML models ($CM_{C1}$, $CM_{C2}$, $CM_{C3}$) each cluster for determining the optimized operational temperature conditions which are then transmitted to the second or next group of local computing devices 102 which is in turn applied to the associated base stations 101. As illustrated in FIG. 7*b*, $LMa_1$ and $LM_{c3}$ are used for training $CM_{C1}$; $LM_b$1, $LM_b$2, $LM_{C3}$ and $LM_{C4}$ are used for training $CM_{C2}$; and $LMa_2$ is used for training $CM_{C3}$. The application of distributed ML such as for e.g., FL with secure aggregation for training the central ML model in some of the embodiments is explained below in detail later.

If there is a significant difference or variation in the operational parameters, such that the computed operational difference measure is above a threshold value then the clusters existing from the previous iteration needs to be reinitialized that is, the regrouping or re-clustering of the local computing devices 102 in the second or next group of local computing devices needs to be performed. For example, if there is significant variation in the operational parameters for more than 70% of the local computing devices 102 of the second or next group of local computing devices and the threshold value is configured as greater or equal to 0.6, then the computed operational difference measure would be above the threshold value, so existing clusters have to be reinitialized as the current grouping of the local computing devices 102 does not represent the new or present condition of the associated base stations 101. The regrouping or re-clustering of the local computing devices 102 of the second or next group of local computing devices into new clusters and creation of central ML models for each new determined cluster is performed as explained above in the initialization or bootstrapping phase of the central computing device 103.

FIG. 7*c* now corresponds to the scenario wherein the second or next group of local computing devices is same as the first or previous group of local computing devices but there was a significant difference or variation in the operational parameters, such that the computed operational difference measure is above a threshold value. Therefore, the regrouping or re-clustering of the local computing devices 102 of the second or next group of local computing devices into new clusters using the steps detailed under the initialization or bootstrapping phase of the central computing device 103 was performed. Now three new clusters and the different groupings of local computing devices as shown in FIG. 7*c* are created after the regrouping or re-clustering of the local computing devices 102 i.e., Cluster 1 comprises the grouping of 102*a*1, 102*b*1, and 102*c*3; Cluster 2 comprises the grouping of 102*b*2, and 102*c*4; and Cluster 3 comprises the grouping of 102*a*2, and 102*c*2. As shown in FIG. 7*d*, a central ML model ($CM_{C1}$, $CM_{C2}$, $CM_{C3}$) is created for each of the three clusters separately and the different local ML models of the local computing devices 102 grouped under each cluster are used for training the central ML model. As explained previously, after the regrouping or re-clustering action, the weights of each central ML model created are reinitialized. As illustrated in FIG. 7*d*, $LMa_1$, $LM_b$1, and $LM_{C3}$ are used for training $CM_{C1}$; $LM_{b2}$, and $LM_{C3}$ are used for training $CM_{C2}$; and $LMa_2$ and $LM_{C4}$ are used for training $CM_{C3}$. The application of distributed ML such as for e.g., FL with secure aggregation for training the central ML model in some of the embodiments is explained below in detail later.

Consider the second scenario when one or more of the local computing devices 102 of the second or next group of local computing devices are different from the local computing devices 102 of the first or previous group of local computing devices. Let us consider that FIG. 7*c* corresponds to clustering of the first or previous group of local computing devices in the previous iteration ($j-1^{th}$ iteration, where j is a positive integer) of the operational phase of the central computing device 103, i.e., Cluster 1 comprises the grouping of 102*a*1, 102*b*1, and 102*c*3; Cluster 2 comprises the grouping of 102*b*2, and 102*c*4; and Cluster 3 comprises the grouping of 102*a*2, and 102*c*2. FIG. 7*d* corresponds to the different central ML models (CMC1, CMC2, CMC3) existing for each of the three clusters and the different local ML models of the local computing devices 102 grouped under each cluster in the previous iteration of the operational phase of the central computing device 103. Now, FIG. 7*e* corresponds to the current iteration ($j^{th}$ iteration, where j is a positive integer) of the operational phase of the central computing device where it can be seen one or more of the local computing devices 102 of the second or next group of local computing devices are different from the local computing devices 102 of the first or previous group of local computing devices. The second or next group of local computing devices, now comprises two more new local computing devices 102*a*3, and 102*c*1 along with the first or previous group of local computing devices (102*a*1, 102*a*2, 102*b*1, 102*b*2, 102*c*2, 102*c*3 and 102*c*4). In the current iteration, the central computing device 103 would acquire updated operational parameters (referred as the operational parameters in general) for each local computing device 102 of the second or next group of local computing devices associated with the plurality of base stations 101. Then, based on similarity measure of the acquired operational parameters of the local computing devices 102*a*3, and 102*c*1, the two local computing devices are grouped under anyone of the existing clusters—Cluster 1, Cluster 2 or Cluster 3. As seen in FIG. 7*e*, the local computing device 102*a*3 is grouped under Cluster 3 and the local computing device 102*c*1 is grouped under Cluster 2. Now using the acquired updated operational parameters of the second or next group of local computing devices, an operational difference measure is computed as explained previously under first scenario.

If there is not much difference or variation in the operational parameters, such that the computed operational difference measure is below a threshold value, then as explained previously under first scenario, the central computing device 103 proceeds with the operation of determining the optimized operational temperature conditions which are transmitted to the second or next group of local computing devices 102 which is in turn applied to the associated base stations 101, wherein distributed ML with secure aggregation is used for determining the optimized operational temperature conditions. As illustrated in FIG. 7*f*, $LMa_1$, $LM_{b1}$, and $LM_{c3}$ are used for training $CM_{C1}$; $LM_{b2}$, $LM_{C1}$, and $LM_{c3}$ are used for training $CM_{C2}$; and $LMa_2$, $LMa_3$, and $LM_{C4}$ are used for training $CM_{C3}$. The application of distributed ML such as for e.g., FL with secure aggregation for training the central ML model in some of the embodiments is explained below in detail later.

If there is a significant difference or variation in the operational parameters, such that the computed operational difference measure is above a threshold value, then as explained previously under first scenario, the clusters existing from the previous iteration needs to be reinitialized that is, the regrouping or re-clustering of the local computing devices 102 in the second or next group of local computing devices needs to be performed. The regrouping or re-clustering of the local computing devices 102 of the second or next group of local computing devices into new clusters and creation of central ML models for each new determined cluster is performed as explained above in the initialization or bootstrapping phase of the central computing device 103. Now, after the regrouping or re-clustering of the local computing devices 102, four new clusters and the different groupings of local computing devices as shown in FIG. 7*g* would be created i.e., Cluster 1 comprises the grouping of 102*a*1, and 102*c*3; Cluster 2 comprises the grouping of 102*b*1, and 102*c*2; Cluster 3 comprises the grouping of 102*a*2, 102*b*2, 102*c*1, and 102*c*4; and Cluster 4 comprises the grouping of 102*a*3, and 102*a*4. As explained previously, after regrouping or re-clustering of the new clusters, the weights of each central ML model created are reinitialized. As shown in FIG. 7*h*, a central ML model ($CM_{C1}$, $CM_{C2}$, $CM_{C3}$, $CM_{C4}$) is created for each of the four clusters separately and the different local ML models of the local computing devices 102 grouped under each cluster are used for training the central ML model. As illustrated in FIG. 7*h*, $LMa_1$, and $LM_{c3}$ are used for training $CM_{C1}$; $LM_{b1}$, and $LM_{C2}$, are used for training $CM_{C2}$; $LM_{a2}$, $LM_{b2}$, $LM_{C1}$, and $LM_{C4}$ are used for training $CM_{C3}$; and $LMa_3$, and $LMa_4$, are used for training $CM_{C4}$. The application of distributed ML such as for e.g., FL with secure aggregation for training the central ML model in some of the embodiments is explained below in detail.

As seen in FIG. 7*b*, 7*d*, 7*f* and 7*h*, for each determined cluster in the central computing device 103 a separate distributed ML network is created. Each distributed ML network of a cluster comprises of a central ML model and the different local ML models of the local computing devices 102 grouped under each cluster. Each central ML model of a cluster is trained through distributed ML such as for e.g., FL with secure aggregation by applying federated averaging that averages the weights of the trained local ML models from all the local computing devices 102 grouped under the cluster. The application of distributed ML such as for e.g., FL with secure aggregation in some of the embodiments of the communication system 200 is explained in detail below.

Distributed ML techniques such as for e.g., FL could be used along with secure aggregation. In FL the training data does not leave the clients' or local computing device at all. Instead of sharing their training data directly, the client or local computing devices themselves compute weight updates using their locally available data. It is a way of training a ML model without directly inspecting clients' or users' data on a central computing device. FL is a collaborative form of ML where the training process is distributed among many users. A central computing device has the role of coordinating between ML models, but most of the work is not performed by a central entity anymore but by a federation of users or client or local computing devices. After the local ML model is initialized in every client or local computing device, it receives the current central ML model from the server or central computing device and uses its locally available data to compute a local ML model update. All these updates are sent back to the server or central computing device where they are averaged, weighted by the number of training examples that the clients used. The server or central computing device then applies this update to the central ML model, typically by using some form of gradient descent. FL is a more flexible technique that allows training a ML model without directly seeing the data. In the communication system 200 as explained earlier the base stations 101 may be operated by different network operators. The different operators will encompass a variety of features, and the resultant local ML model of each base station will learn their characteristics. The operators often will not want to share their sensitive data out of their premises as it is may be extremely privacy invasive or they may not prefer to share it in public domain due to other reasons. Hence, distributed ML, such as FL, may provide a suitable solution that can be leveraged to greater benefit such that the communication system 200 can function across multiple operators, without each operator having to share sensitive data.

We would now describe the application of distributed ML such as for e.g., FL with secure aggregation with reference to FIG. 7*b*. It is to be noted that the below description is not limiting to the scenario explained under FIG. 7*b* only but also applicable to the scenarios depicted in FIG. 7*d*, 7*f*, 7*h* and other possible scenarios not covered in this disclosure. In FIG. 7*b*, it is shown how a distributed ML network is created for each of the three clusters separately, which comprises a central ML model ($CM_{C1}$, $CM_{C2}$, $CM_{C3}$) and the different local ML models of the local computing devices 102 grouped under each cluster, i.e., $LMa_1$ and $LM_{C3}$ are grouped with $CM_{C1}$ under Cluster 1; $LM_{b1}$, $LM_{b2}$, $LM_{C3}$ and $LM_{C4}$ are grouped with $CM_{C2}$ under Cluster 2; and $LMa_2$ is grouped with $CM_{C3}$ under Cluster 3.

The process steps of performing distributed ML such as for e.g., FL with secure aggregation for training the central ML model of each cluster in the central computing device 103 explained below are executed repetitively for each cluster for multiple iterations or epochs until the trained central ML model of each cluster attains an acceptable level of performance. After the initial iterations or epochs of training of the central ML models of each cluster, the central computing device 103 may transmit the weights and model parameters of the trained central ML model of each cluster to each of the local computing devices 102 grouped under each cluster. The transmitted weights and model parameters of the trained central ML model comprises information about optimal operational temperature conditions that may be applied to the associated base stations of each of the local computing devices 102 grouped under each cluster and the weights for training the local ML models. The operational temperature conditions comprise at least one of: increasing or decreasing the rotational speed of fans, switching on or off fans, increasing or decreasing the temperature of heaters, and switching on or off heaters. The model parameters of the trained central ML model may also comprise generic information or data pertaining to the central ML model for example the information of the cluster under which it is grouped such as a Cluster ID. The local computing devices 102 then train its local ML model using the received weights and model parameters of its corresponding cluster central ML model and base station specific data. The training of the local ML model in a local computing device 102 is explained in detail later. After transmitting the weights and model parameters of the trained central ML model, the central computing device 103 may acquire weights and model parameters of a trained local ML model from each of the local computing devices 102 grouped under each cluster. The model parameters of a trained local ML model may comprise generic information or data pertaining to the local ML model for example the information of the cluster under which it is grouped such as a Cluster ID may be used by the central computing device 103 in identifying to which cluster a local computing device 102 is grouped. Each central ML model of each cluster is then trained using some of the acquired weights of the trained local ML models, wherein the training of each central ML model may be performed using federated averaging. In federated averaging process, the average of the weights of the trained local ML models from all the local computing devices 102 grouped under a cluster is determined and the determined average is then set as the weight of the corresponding central ML model of the cluster. This now completes one iteration or epoch of training the central ML model of each cluster using distributed ML with secure aggregation. The central computing device 103 then determines whether each of the cluster i.e., the trained central ML model of each determined cluster has attained an acceptable level of performance. The acceptable level for the trained central ML model of each determined cluster is identified based on the acquired weights and model parameters of the trained local ML model from each of the local computing devices grouped under each determined cluster for e.g., it is ascertained whether the predictions provided by the central ML model are accurate or not. If the trained central ML model of a determined cluster has attained an acceptable level, then the training process of the central ML model is stopped for that cluster. If the trained central ML model of a determined cluster has not attained an acceptable level, then the training process of the central ML model is executed repetitively for that cluster for multiple iterations or epochs until the trained central ML model attains an acceptable level of performance.

As explained in the second scenario above, the local computing devices 102 can be added to or removed from a cluster at any iteration or epoch. The clusters always start training of its central ML model from the beginning of an iteration or epoch such that it gets the updated weights of the grouped local ML models from the central computing device 103. So, if a local computing device 102 is added into a cluster in between an iteration or epoch say during iteration 2 then the local ML model of the local computing is not considered for central ML model training until the next iteration i.e., iteration 3 starts and the central ML model of that cluster receives updated weights of all the grouped local ML models from the central computing device 103.

By using distributed ML techniques such as for e.g., FL along with secure aggregation the local computing device 102 do not need to share the training data of the base stations 101. Only the weights and requisite model parameters of the local ML models are shared with the central computing device 103, the weights shared are then aggregated centrally at the central computing device 103. In this way operators do not have to share sensitive operational data which makes the communication system 200 more advantageous, flexible and compatible to be used across multiple operators. The use of FL with secure aggregation enables the transfer of the weights to be done securely and anonymously which in turn adds security to the privacy protection of normal FL technique. Also, the use of FL with secure aggregation is much less expensive in terms of bandwidth required to transfer weights rather than to transfer operational data for e.g., the weights are typically a few megabytes, while operational data can be in gigabytes or terabytes. Thus, by using distributed ML techniques such as for e.g., FL along with secure aggregation, it provides the benefits of bandwidth-savings and data privacy.

At the local or micro level, the plurality of base stations in the communication system 200, are in communication with a central computing device 103 via the local computing device 102 associated with each base station 101. The local computing device 102 of each base station 101 functions in two phases—(i) training phase, and (ii) operation phase.

In the training phase, each base station 101 in the communication system 200 trains a local ML model hosted in the associated local computing device 102 using the base station specific data. In some embodiments, the local ML model in a local computing device 102 is any one of the following ANNs: a multi-layer perceptron such as a CNN, a RNN, such as a LSTM etc. The local computing device 102 utilizes ML techniques like reinforcement learning (RL) process, unsupervised learning etc. to train the local ML model using base station specific data. Typically, Deep Q-learning is used for training the local ML model in the local computing device 102 and the trained local ML model is used to determine the optimized operational temperature conditions to be applied to the base station 101. The base station specific data is generally provided by the baseband unit of the base station 101 to the local computing device 102. The base station specific data comprises property measurements of one or more properties affecting the operational temperature conditions of the base station 101. The property measurements of one or more affecting properties are obtained from the different sensors and other components of the base station 101 like temperature sensors, pressure sensor, operating system monitors, load analyzer etc. The properties affecting the operational temperature conditions of a base station 101 comprise at least one or more of: (i) environmental or climatic factors, (ii) state factors, (iii) information about the hardware and/or software configuration and so on as explained in detail earlier.

RL is a flexible framework that applies data driven optimization to control problems by attempting to maximize an expected cumulative reward for a series of actions utilizing trial-and-error or exploration and exploitation process. An RL agent is trained for each environment. It is based on an agent's interaction with an environment, where the RL agent visits different states of the environment, for each state of the environment predicts and executes the best possible action towards the environment and receives rewards for such actions. The best possible action in context of RL is identified as the action which would yield the highest amount of current and future reward. One common algorithm applied by RL agents is the so-called Deep Q-Network (DQN) RL algorithm. The goal of RL agent is to find a policy that optimizes a value function. The value function is a mapping between the different states and the expected rewards, also known as the expected return. An optimal policy selects actions that lead to a state with the highest expected return. In some embodiments, so-called meta RL may be applied to handle the continuously changing environment.

Managing the operational temperature conditions of the different base stations operating in a complex distributed communication network is a challenge especially when there are hundreds or thousands of base stations in the communication network. For such challenging distributed communication network, ML techniques such as RL enable effectiveness and adaptiveness in controlling the different operations. RL can provide a powerful solution for dealing with the problem of optimal decision making for agents interacting with uncertain environments. In FIG. 6, a schematic illustration of how RL is used for training a local ML model in a local computing device 102 associated with a base station 101 is shown. A local ML model is trained for each base station 101 in the corresponding local computing device 102. As shown in FIG. 6 the local ML model in the local computing device 102 acquires information (state descriptions, rewards) from, and transmits actions to, the corresponding base station 101 for which the operational temperature is to be controlled. At step S1, the local ML model acquires information on current state description S of the base station 101 from the baseband unit of the base station 101. The state description S may be characterized using the base station specific data comprising property measurements of one or more properties affecting the operational temperature conditions of the base station explained above i.e., environmental or climatic factors, state factors, information about the hardware and/or software and so on. The local ML model then processes the received state description S and generates one or more actions to be taken; one of these actions is then selected to be implemented. The action A to be implemented is selected by the local ML model from actions available to the local ML model with the aim of maximizing the cumulative reward. Here, the choice of the action A to be implemented is dependent upon a selection policy which balances exploration of the action space with exploitation. For example, an epsilon-greedy selection policy prefers random choice of action in early iterations or episodes of the ML training. At step S2, the selected action A to be implemented is then transmitted back to the base station 101 and put into effect for managing the operational temperature of the base station 101 by adjusting the operations of the fans and/or the heater. The adjusting operations may comprise of a command to turn on or off the heater or the fan unit as a whole or individual fans in the fan unit, it can also be to regulate the speed of the fans and/or the output signal to the heater, for example specify the amount of power to be supplied to the heater element or the rotations per minute (RPM) to spin the fans. The result of the action A implemented is a change in the state description S' in the base station 101. The action A also results in a (numerical, typically scalar) reward R generated using a reward function, which is a measure of effect of the action A resulting in changed state descriptions S'. The reward R indicates how well the base station 101 responds to the changed state descriptions S' when the action A is implemented. The reward could be for example the measurement of operational temperature of the base station 101 for a time after the action A took place and depending on the desired outcome i.e., increase or decrease of operational temperature, and comparison of the desired outcome with the actual values. The reward R can be assigned a scalar value, i.e., a normalized integer from 0 to 1 by the reward function. At step S3, the information about the changed state descriptions S' along with the reward R, is transmitted from the baseband unit of the base station 101 to the local ML model in the local computing device 102. Based on the changed state descriptions S' and the reward R received from the base station 101, the local ML model will accordingly take the next appropriate action in terms of managing the operational temperature of the base station 101 by adjusting the speed of the fans and/or the output signal to the heater.

Before training, the initialization parameters of the local ML model are typically set to generic values so that the local ML model does not initially favour any particular action or actions over other actions, however in some embodiments the initialization parameters may be set to non-generic values. For training the local ML model in the local computing device 102—a set of actions are determined based on an exploration and exploitation process of the different states of the base station specific data, wherein each action of the set of actions comprises operational temperature conditions to be applied to the base station 101 based on the base station specific data that is corresponding state of the base station 101. The operational temperature conditions that are applied to the base station 101 comprise at least one of: increasing or decreasing the rotational speed of fans, switching on or off fans, increasing or decreasing the temperature of heaters, and switching on or off heaters. A reward is generated for each action of the set of actions using a reward function wherein the reward typically is a scalar value indicating how well the base station 101 responded when the action was implemented. Then, a subset of actions from the set of actions is determined such that the generated reward for each action of the subset of actions is above a predefined level of acceptance for example, the predefined level of acceptance is configured as greater or equal to 0.75. The subset of actions determined are supposed to have the most beneficial effect on the base station 101, for example, increases the energy efficiency of climate system of the base station. The local ML model in the local computing device 102 is trained using the determined subset of actions.

After the completion of the training phase, the local computing device 102 may perform the initial profiling of the base station specific data based on property measurements of the one or more properties affecting the operational temperature conditions of the base station 101 measured at the time of performance of the initial profiling. In the initial profiling step, the operational parameters of the base station 101 are generated in the local computing device 102 using base station specific data based on property measurements of the one or more properties affecting the operational temperature conditions of the base station 101 measured at the time of the initial profiling. The operational parameters of a local computing device 102 is a serialized data structure comprising property measurements of one or more properties affecting the operational temperature conditions of the corresponding base station 101. The properties affecting the operational temperature conditions of a base station 101 comprise at least one or more of: (i) environmental or climatic factors, (ii) state factors, (iii) information about the hardware and/or software configuration and so on as explained in detail earlier.

The property measurements of one or more affecting properties are obtained from the different sensors and other components of the base station 101 like temperature sensors, pressure sensor, operating system monitors, load analyzer etc. The obtained property measurements are then generally provided by the baseband unit of the base station 101 to the local computing device 102. The operational parameters may comprise the property measurements of one or more affecting properties obtained at that time instant for example, at the time of performance of the initial profiling step. The operational parameters may also be created in the local computing device 102 by averaging the property measurements provided by the baseband unit to the local computing device 102 over a period of time. The operational parameters of the local computing device are like a unique climate signature of the local computing device 102 i.e., the associated base station 101. The operational parameters generated based on the initial profiling of the base station specific data are then typically transmitted to the central computing device 103. The operational parameters transmitted may comprise a unique identifier which is generally used by the central computing device 103 for identifying the local computing device 102 which is sending the operational parameters. The operational parameters may be transmitted in any suitable format to the central computing device 103; an example of a suitable format is as an output vector, with different properties forming different fields or features of the vector, an illustration is given below:

Operational Parameters=[$L_{CD}$_ID, operational_data(<climate>, <rbs_state>, <hw_information>); wherein $L_{CD}$_ID is a unique identifier associated with each local computing device and operational_data contains the property measurements of the different properties of the base station.

The operational parameters may be continuously transmitted to the central computing device 103 from the local computing device 102 periodically or on request. The periodic time interval can be a configurable value based on the functioning requirements of the communication system 200. As explained above in the initialization or bootstrapping phase of the central computing device 103, the operational parameters received from the local computing devices are used for determining clusters; grouping each local computing device under one of the determined clusters; creating a central ML model for each cluster which are initialized and trained; and transmitting the weights and model parameters of the trained central ML model of each cluster to each of the local computing devices 102 grouped under each cluster.

The local computing device 102 then moves to the operation phase wherein distributed ML such as for e.g., FL with secure aggregation is applied for training the local ML model for managing operational temperature conditions of the associated base station 101. The below-mentioned process steps in the operation phase of the local computing device 102 are executed repetitively for indefinite iterations or epochs until a predefined condition is satisfied. The predefined condition may be set to for example the trained local ML model has attained an acceptable level of performance, wherein the acceptable level could be determined by measuring the reward generated in the local ML model. In the operation phase, for each iteration or epoch, first the local computing device 102 would acquire from the central computing device 103, the weights and model parameters of the central ML model of the cluster under which the local computing device 102 is grouped in the central computing device 103. The transmitted weights and model parameters of the trained central ML model comprises information about optimal operational temperature conditions that are applied to the base station, wherein, the operational temperature conditions comprise at least one of: increasing or decreasing the rotational speed of fans, switching on or off fans, increasing or decreasing the temperature of heaters, and switching on or off heaters. The local computing device 103 then trains the local ML model using the received weights and model parameters of its corresponding cluster central ML model and base station specific data using ML techniques like RL as explained above in the training phase. After training the local ML model, the local computing device 102 may perform the re-profiling of the base station specific data based on property measurements of the one or more properties affecting the operational temperature conditions of the base station 101 measured at the time of performance of the re-profiling. In the re-profiling step, the operational parameters of the base station 101 are generated in the local computing device 102 using base station specific data based on property measurements of the one or more properties affecting the operational temperature conditions of the base station 101 measured at the time of the re-profiling. The operational parameters generated based on the re-profiling of the base station specific data are transmitted to the central computing device 103. The operational parameters may be continuously transmitted to the central computing device 103 from the local computing device 102 periodically or on request. After training the local ML model, the local computing device 102 transmits to the central computing device 103, weights and model parameters of the trained local ML model. The local computing device 102 then using the trained local ML model can determine the optimized operational temperature conditions to be applied to the associated base station 101. For example, the local computing device 102, based on the current base station specific data of the base station 101 using the trained local ML model can determine the optimized operational temperature conditions to be applied to the associated base station 101, wherein the optimized operational temperature conditions may comprise of a command to turn on or off the heater or the fan unit as a whole or individual fans in the fan unit, it can also be to regulate the speed of the fans and/or the output signal to the heater. By training the local ML model locally in the local computing device 102 of the base station 101 using the weights and model parameters of the central ML model and radio base station specific data provides the advantages of reduced model LCM costs, reduced computational requirements, as well as data transport requirements. The method enables granular control over temperature of the different hardware of the base station which helps in increasing its durability and lifetime.

The local ML models trained by the local computing devices 102 of the different base stations 101 and shared with the central computing device 103 in the communication system may be homogeneous ML models or heterogeneous ML models. In the case of homogeneous ML models, all the local ML models in the local computing devices 102 should be of the same type i.e., all local ML models are, for example only CNN or only RNN etc. In the case of heterogeneous ML models, the local ML models in the local computing devices 102 may be of the different types i.e., the local ML models are, for example combination of CNN and RNN. Any of the available solutions could be implemented in the communication system 200 for handling heterogeneous ML models during the application of distributed ML such as for e.g., FL with secure aggregation. Both in the case of homogeneous ML models or heterogeneous ML models implementation, the local ML models shared by the local computing devices 102 with the central computing device 103 preferably be of the same configuration, for e.g., same number of layers, neurons per layer, activation functions and so on. This provides the network operators hosting the base stations 101 the option and flexibility to select the different type of local ML models based on their requirements.

To conclude, the local ML model in the local computing device 102 is trained using hybrid RL and FL with secure aggregation techniques, and actions are predicted in advance by the trained local ML model to implement in the base station 101 to arrive at an optimal policy regarding what adjustments to be performed for the fan(s) and/or heater(s) of the base station 101 to manage the operational temperature of the base station 101 in a time-efficient and effectual manner. As mentioned earlier, the operational temperature of a base station 101 may be continuously and slowly changing as it is affected by the variations that happens to the base station specific data. Hence, the local ML model used to determine the optimized operational temperature conditions to be applied to the base station need to continuously change its policy and be further trained regularly.

Figure 3:
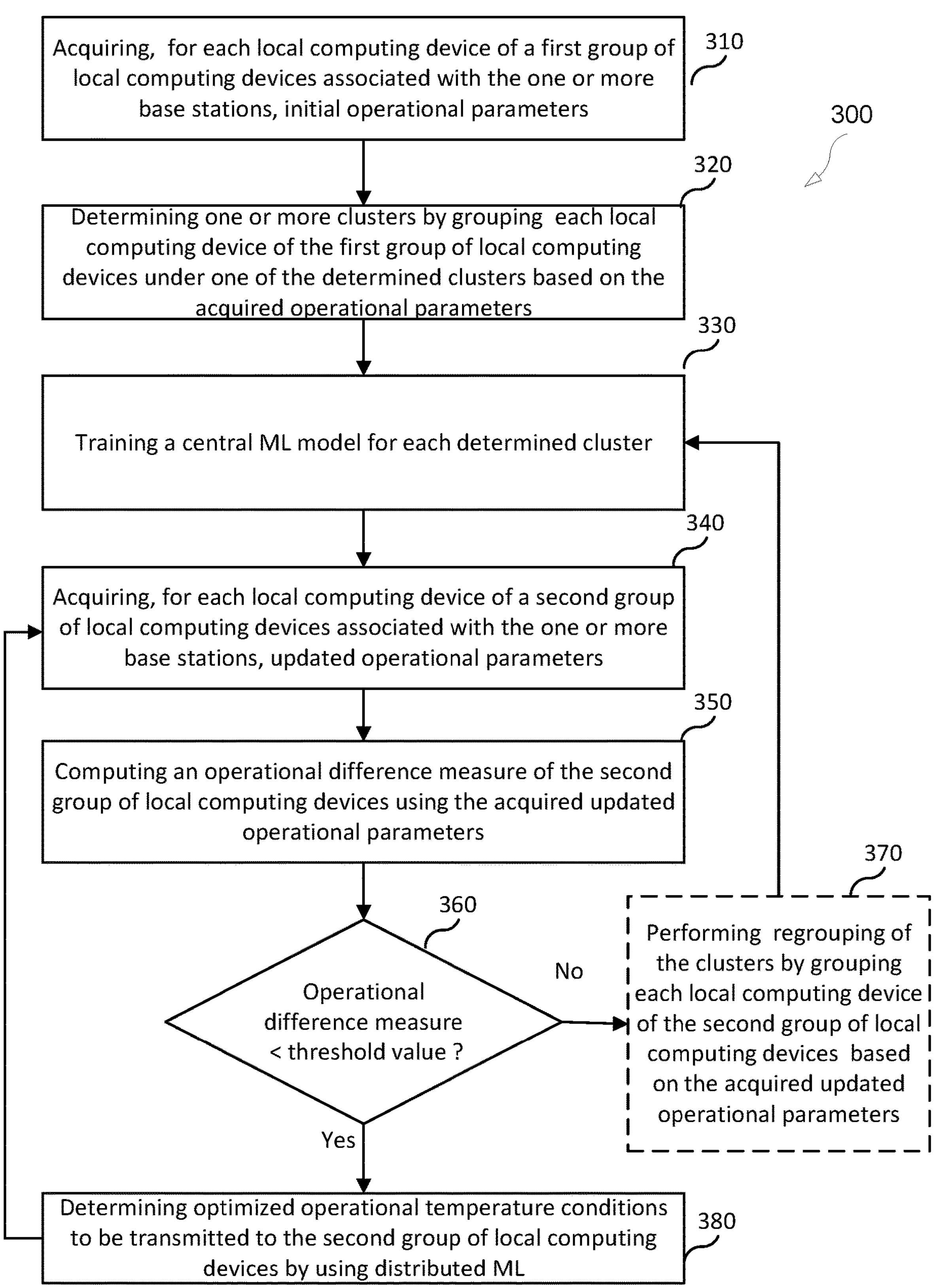
FIG. 3 shows a flowchart depicting a method performed in a communication system according to embodiments herein.

FIG. 3 shows a flowchart depicting a method performed in a communication system according to embodiments herein. In FIG. 3, a schematic flowchart of a method 300 performed in a central computing device 103 of a communication system 200, for managing operational temperature conditions of one or more base stations 101 in the communication system 200 is illustrated. The method 300 may comprise the steps described below. In some embodiments, some of the steps may be performed. In some embodiments, all the steps may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 3, optional actions are indicated with a dashed box.

In step 310, the central computing device 103 acquires initial operational parameters for each local computing device 102 of a first group of local computing devices associated with the one or more base stations 101. The initial operational parameters for each local computing device 102 of the first group of local computing devices comprises property measurements of the one or more properties affecting the operational temperature conditions of the one or more base stations 101, wherein the one or more properties affecting the operational temperature conditions comprise at least one of: a load on the base station; an ambient temperature experienced by the base station; an internal temperature of the base station; an information about hardware and/or software installed in the base station; a humidity level recorded at the base station; a pressure variations recorded at the base station; and a level of airflow recorded at the base station.

In step 320, the central computing device 103 determines one or more clusters by grouping each local computing device 102 of the first group of local computing devices under one of the determined clusters based on the acquired operational parameters. The determining of one or more clusters is performed using any one of K-means clustering, hierarchical clustering, K-medoids, DBSCAN, GMM or KNN. The grouping of each local computing device 102 of the first group of local computing devices is based on similarity measure of the acquired operational parameters.

In step 330, the central computing device 103, trains a central ML model for each determined cluster. The central ML model is any one of the following ANNs: a multi-layer perceptron such as a CNN, a RNN such as a LSTM etc.

In step 340, the central computing device 103 acquires updated operational parameters for each local computing device 102 of a second group of local computing devices associated with the one or more base stations 101. Here, either: (i) all the local computing devices 102 of the next or second group of local computing devices are same as the local computing devices 102 of the previous or first group of local computing devices; or (ii) one or more of the local computing devices 102 of the next or second group of local computing devices are different from the local computing devices 102 of the first group of local computing devices. The acquired updated operational parameters for each local computing device 102 of the second group of local computing devices comprises property measurements of the one or more properties affecting the operational temperature conditions of the one or more base stations 101, wherein the one or more properties affecting the operational temperature conditions are as explained above in detail.

In step 350, the central computing device 103 computes an operational difference measure of the second group of local computing devices 102 using the acquired updated operational parameters. The operational difference measure is computed by determining operational parameters difference using the acquired updated operational parameters and previous operational parameters for each local computing device of the second group of local computing devices; and computing the operational difference measure of the second group of local computing devices using the determined operational parameters difference of each local computing device of the second group of local computing devices wherein the operational parameters difference measure is a normalized value from 0 to 1. In step 360, the central computing device 103 determines whether the computed operational difference measure is less than a threshold value or not. If the computed operational difference measure is less than a threshold value, then in step 380 the central computing device 103 determines optimized operational temperature conditions to be transmitted to the second group of local computing devices by using distributed ML. The steps 340 to 360 are performed repetitively for multiple iterations after step 380 is executed. If the computed operational difference measure is greater than the threshold value, then in step 370 the central computing device 103 may perform regrouping of the one or more clusters by grouping each local computing device 102 of the second group of local computing devices under one of the new clusters based on the acquired updated operational parameters. The steps 330 to 360 are performed repetitively for multiple iterations after step 370 is executed.

Figure 4:
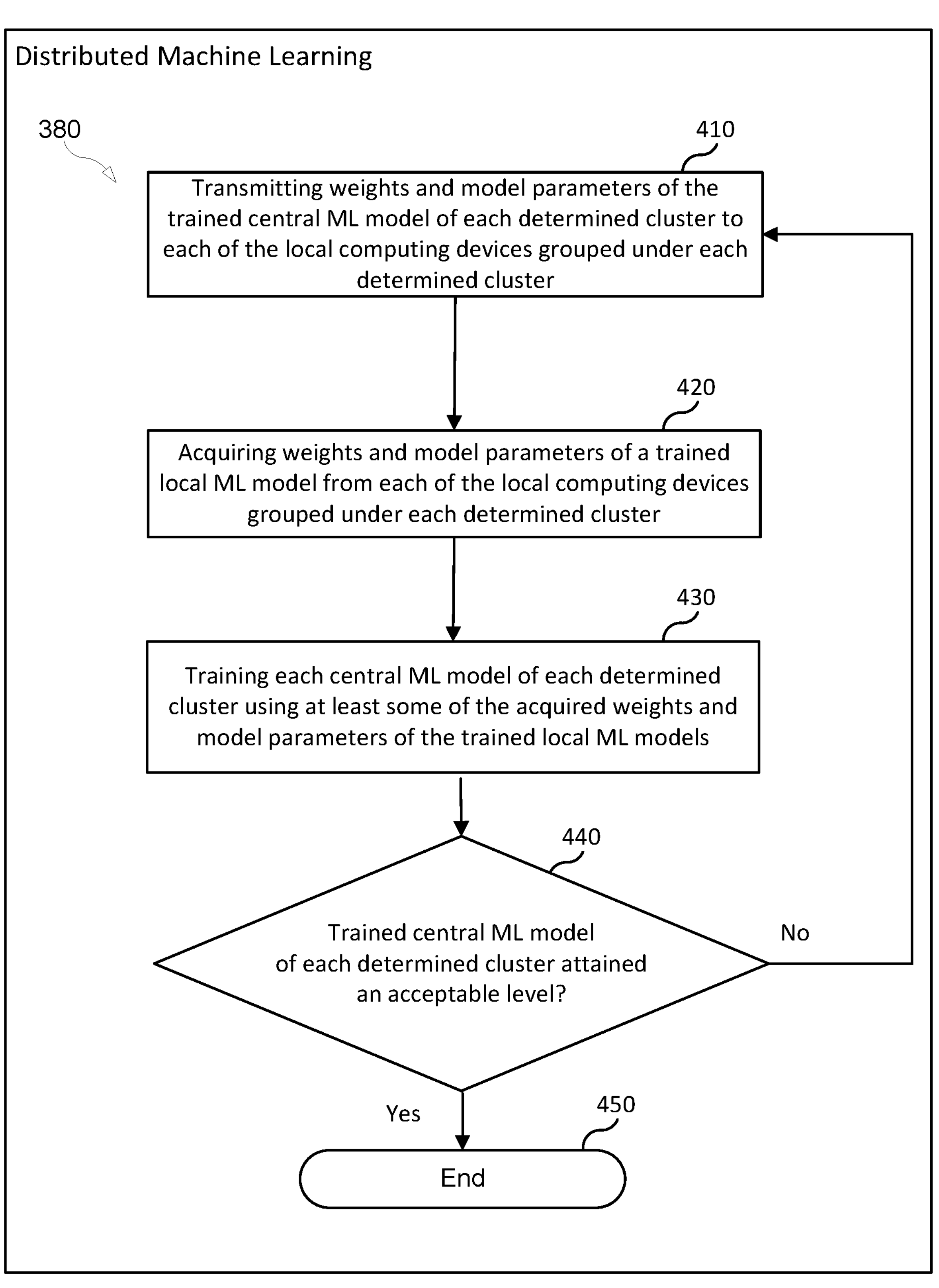
FIG. 4 shows a flowchart depicting another method performed in a communication system according to embodiments herein.

The step 380 of determining optimized operational temperature conditions to be transmitted to the second group of local computing devices by using distributed ML will now be discussed in more detail, with reference to method 380 shown in FIG. 4. In step 410, the central computing device 103 transmits weights and model parameters of the trained central ML model of each determined cluster to each of the local computing devices 102 grouped under each determined cluster. The weights and model parameters of the trained central ML model transmitted to each of the local computing devices grouped under each determined cluster comprises information about optimal operational temperature conditions of the one or more base stations. In step 420, the central computing device 103, acquires weights and model parameters of a trained local ML model from each of the local computing devices 102 grouped under each determined cluster. In step 430, the central computing device 103, trains each central ML model of each determined cluster using at least some of the acquired weights and model parameters of the trained local ML models, wherein the training of each central ML model is performed for example using federated averaging. In step 440, the central computing device 103, performs repetitively steps 410 to 430 until the trained central ML model of each determined cluster attains an acceptable level of performance, wherein the acceptable level for the trained central ML model of each determined cluster is identified based on the acquired weights and model parameters of the trained local ML model from each of the local computing devices grouped under each determined cluster.

Figure 5:
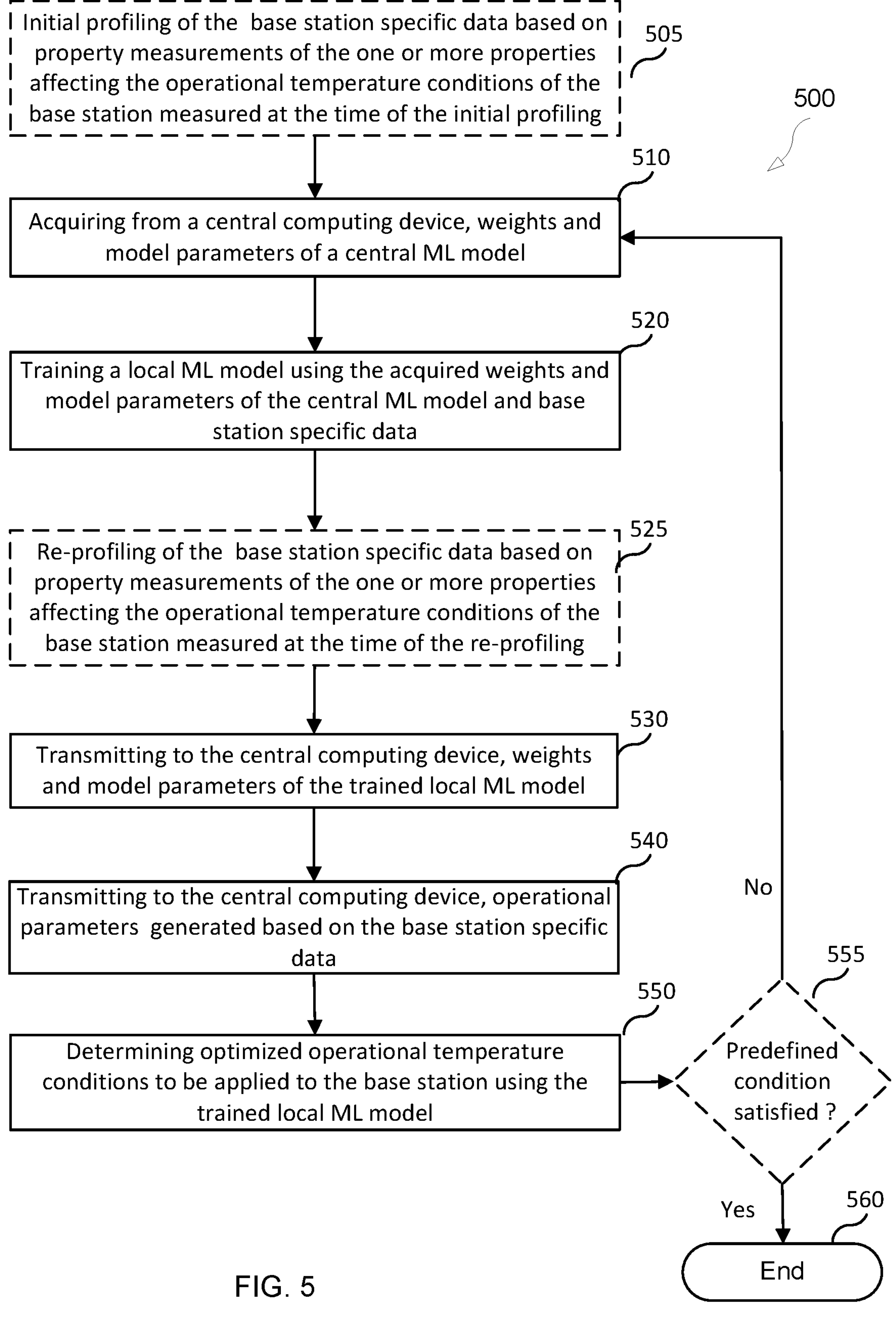
FIG. 5 shows a flowchart depicting yet another method performed in a communication system according to embodiments herein.

FIG. 5 shows a flowchart depicting a method performed in a communication system according to embodiments herein. In FIG. 5, a schematic flowchart of a method 500 performed in a local computing device 102 of a communication system 200, for managing operational temperature conditions of a base station 101 in the communication system 200 is illustrated. The method 500 may comprise the steps described below. In some embodiments, some of the steps may be performed. In some embodiments, all the steps may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 5, optional actions are indicated with a dashed box.

In step 505, the local computing device 102 may perform initial profiling of the base station specific data based on property measurements of the one or more properties affecting the operational temperature conditions of the base station 101 measured at the time of the initial profiling. This step 505 of initial profiling is optional as it depends how the base station specific data changes over time, sometimes the base station specific data already present in the local computing device 102 from previous time instants may be used. For example, in base stations located in rural areas where traffic profile is the same and in climates where temperature does not fluctuate a lot, thus the properties affecting the operational temperature conditions of the base stations do not change so much. In step 510, the local computing device 102 acquires from a central computing device 103, weights and model parameters of a central ML model. In step 520, the local computing device 102 trains a local ML model using the acquired weights and model parameters of the central ML model and base station specific data wherein, ML is utilized for training the local ML model and the base station specific data comprises property measurements of one or more properties affecting the operational temperature conditions of the base station 101. The one or more properties affecting the operational temperature conditions comprise at least one of: a load on the base station; an ambient temperature experienced by the base station; an internal temperature of the base station; an information about hardware and/or software installed in the base station; a level of airflow recorded at the base station; a pressure variation recorded at the base station; and a humidity level recorded at the base station. The ML utilized for training the local ML model, performs ML using Deep-Q RL process. The Deep-Q RL process comprises the steps of: generating a reward relating to each action of a set of actions using a reward function wherein the set of actions are determined based on an exploration and exploitation process of the base station specific data; determining a subset of actions from the set of actions such that the generated reward for each action of the subset of actions is above a predefined level of acceptance; training the local ML model using the determined subset of actions; and generating the weights and model parameters of the trained local ML model to be transmitted to the central computing device 103. Each action of the set of actions comprises operational temperature conditions to be applied to the base station 101. In step 525, the local computing device 102 may perform re-profiling of the base station specific data based on property measurements of the one or more properties affecting the operational temperature conditions of the base station 101 measured at the time of the re-profiling. This step 525 of re-profiling is optional as it depends how the base station specific data changes over time, sometimes the base station specific data already present in the local computing device 102 from previous time instants may be used. For example, in base stations located in rural areas where traffic profile is the same and in climates where temperature does not fluctuate a lot, thus the properties affecting the operational temperature conditions of the base stations do not change so much. In step 530, the local computing device 102 transmits to the central computing device 103, weights and model parameters of the trained local ML model. In step 540, the local computing device 102 transmits to the central computing device 103, operational parameters generated based on the base station specific data. In step 550, the local computing device 102 determines optimized operational temperature conditions to be applied to the base station 101 using the trained local ML model. The operational temperature conditions comprise at least one or more of: increasing or decreasing the rotational speed of fans, switching on or off fans, increasing or decreasing the temperature of heaters, and switching on or off heaters. In step 555, the local computing device 102, may perform repetitively steps 510 to 550 until a predefined condition is satisfied. The step 555 of determining the satisfaction of the predefined condition is optional as during the initial iterations or episodes this step may not be performed for example as the trained local ML model has not attained an acceptable level of performance. Also, the step 555 is optional as it depends how the base station specific data changes over time, if the properties affecting the operational temperature conditions of the base stations do not change so much, there would not be much variance in the performance conditions. The step 555 may be performed only after an initial set of iterations or episodes are executed and the steps 510 to 550 may be performed repetitively when the step 555 is not performed.

Figure 8A:
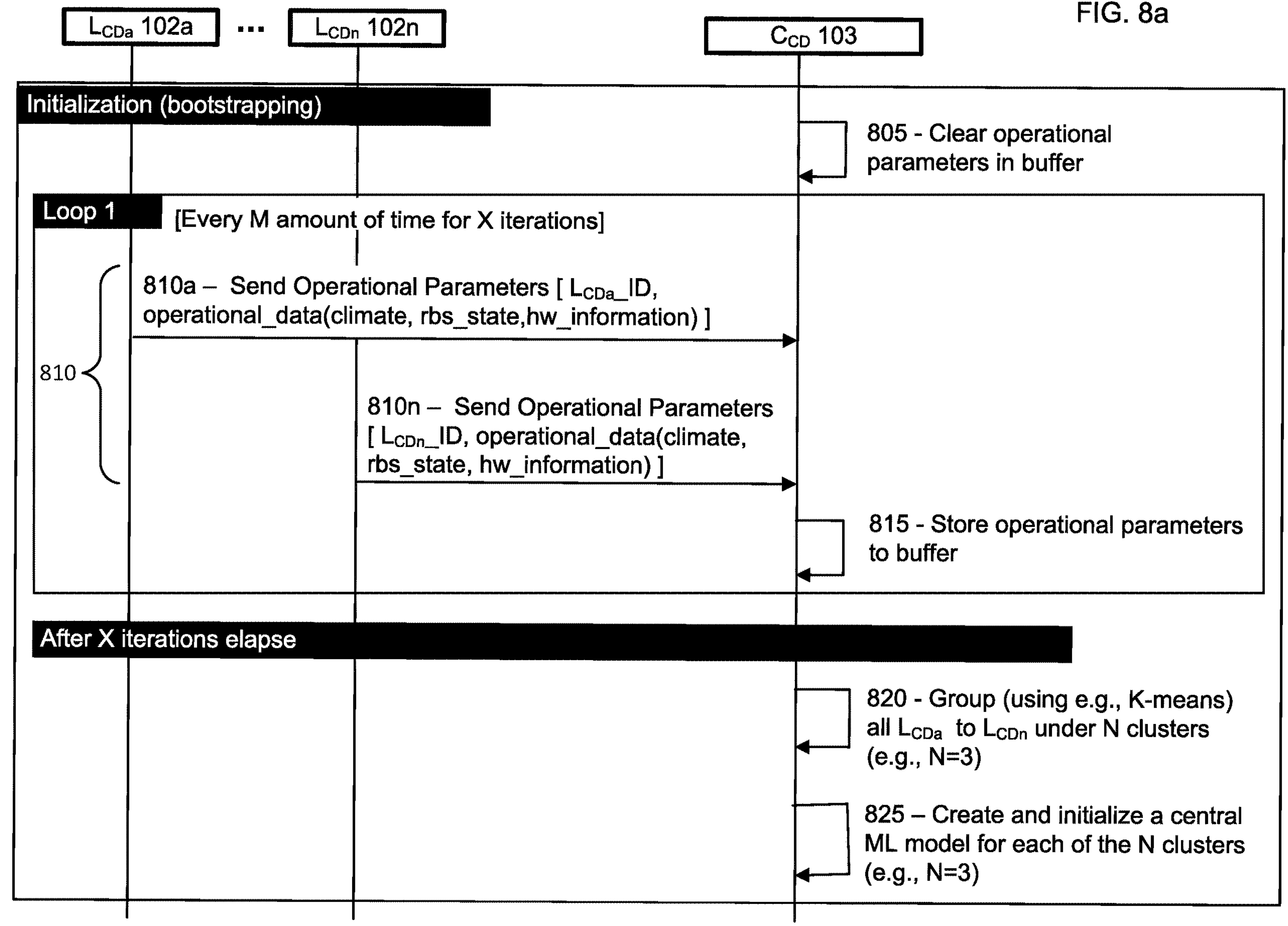

A process or method for managing operational temperature conditions of one or more base stations 101 in the communication system 200 using the plurality of local computing devices 102 and central computing device 103 is illustrated in the sequence diagram of FIG. 8A, FIG. 8B and FIG. 8C (collectively FIG. 8). FIG. 8 shows the operations performed by the central computing device CCD 103 and the plurality of local computing devices, $L_{CDa}$ 102*a* to $L_{CDn}$ 102*n*, where a and n are positive integers. FIG. 8A shows the initialization or bootstrapping phase explained above under functioning of the central computing device 103, and FIG. 8B and FIG. 8C shows the operation phase explained above under functioning of the central computing device 103 and the local computing device 102. For the ease of explanation, only two local computing devices, $L_{CDa}$ 102*a* and $L_{CDn}$ 102*n* are shown in FIG. 8 and it will be obvious to a person skilled in the art that the details provided for $L_{CDa}$ 102*a* and $L_{CDn}$ 102*n* can be applied to other local computing devices also in the similar manner.

The steps 805 to 825 shown in FIG. 8A corresponds to the initialization or bootstrapping phase of the central computing device 103. In step 805, the central computing device 103 clears the buffer which is used for storing the operational parameters acquired from the different local computing devices 102*a*-102*n*. After clearing the buffer, the steps identified under Loop 1 are executed repetitively for X iterations for every M amount of time wherein, X and M are preconfigurable values or conditions set based on the various functioning requirements of the communication system 200. In step 810, the local computing devices 102*a*-102*n* sends the operational parameters to the central computing device 103. As explained earlier, the operational parameters of a local computing device 102 is a serialized data structure comprising property measurements of one or more properties affecting the operational temperature conditions of the corresponding base station 101. In step 815, the central computing device 103 would store the operational parameters received from the local computing devices 102*a*-102*n* into the buffer. The central computing device 103 may acquire multiple sets of operational parameters for a local computing device 102 and then averaging of the multiple sets can be done to determine the operational parameters for that local computing device 102.

After the execution of Loop 1 for X iterations, in step 820, the central computing device 103 by applying a clustering algorithm determines one or more clusters by grouping the local computing devices 102*a*-102*n* based on the acquired operational parameters. In step 825, for each of the determined cluster, a central ML model is created and the weights of each central ML model are initialized.

The steps 830 to 865 shown in FIG. 8B and FIG. 8C corresponds to the operation phase of the central computing device 103 and the local computing devices 102*a*-102*n*. The steps identified under Loop 2 are executed repetitively for indefinite iterations or several predefined number of iterations, for every N amount of time wherein, N is a preconfigurable value or condition set based on the various functioning requirements of the communication system 200, and N of Loop 2>>M of Loop 1.

In step 830, the local computing devices 102*a*-102*n*, sends the operational parameters to the central computing device 103. In step 835, the central computing device 103 computes operational parameters difference for each of the local computing devices 102*a*-102*n*, by comparing the acquired operational parameters of the local computing devices 102*a*-102*n* in step 830, with the previous operational parameters of each local computing device 102.

If dissimilarities are identified in the determined operational parameters difference i.e., the acquired operational parameters of any of the local computing devices 102*a*-102*n* is different from the previous operational parameters, then step 840 and optionally step 845 are executed. In step 840, the central computing device 103 computes the operational difference measure of the local computing devices 102*a*-102*n*. The operational difference measure is used for determining whether there is a significant difference or variation between the updated operational parameters and the previous operational parameters for a number of local computing devices 102. If there is a significant difference or variation in the operational parameters, such that the computed operational difference measure is above a threshold value then in step 840 the clusters existing in the central computing device 103 from the previous iteration needs to be reinitialized that is, the regrouping or re-clustering of the local computing devices 102 *a*-102 *n* is performed using the steps 805 to 825 detailed under the initialization or bootstrapping phase as shown in FIG. 8*a*. If there is not much difference or variation in the operational parameters, such that the computed operational difference measure is below a threshold value, then the central computing device 103 proceeds with the operation of initiating secure aggregation as shown in FIG. 8*c*.

For the ease of explanation, the different central ML models of the different clusters are not shown in FIG. 8*c*. and it will be obvious to a person skilled in the art that the details provided can be applied to each cluster also in the similar manner. The steps identified under Loop 3 corresponds to performing distributed ML with secure aggregation for training the central ML model of each cluster in the central computing device 103. The steps 850 to 865 identified under loop 3 are executed repetitively for multiple iterations or epochs until the trained central ML model of each cluster attains an acceptable level of performance.

In step 850, the central computing device 103 transmits the weights and model parameters of the trained central ML model of each cluster to each of the local computing devices 102*a*-102*n* grouped under each cluster. The transmitted weights and model parameters of the trained central ML model comprises information about optimal operational temperature conditions that are applied to the associated base stations of each of the local computing devices 102 grouped under each cluster and the weights for training the local ML models. In step 855, the local computing devices 102*a*-102*n*, train its local ML model using the received weights and model parameters of its corresponding cluster central ML model and base station specific data.

In step 860, the local computing devices 102*a*-102*n* sends the weights and model parameters of the trained local ML model to the central computing device 103. In step 865, each central ML model of each cluster in the central computing device 103 is trained using the acquired weights and model parameters of the trained local ML models, wherein for example the training of each central ML model may be performed using federated averaging. The central computing device 103 then determines whether each of the cluster i.e., the trained central ML model of each determined cluster has attained an acceptable level. If the trained central ML model of a determined cluster has attained an acceptable level, then the process of training the central ML model using distributed ML with secure aggregation is stopped for that cluster. If the trained central ML model of a determined cluster has not attained an acceptable level, then the steps 850 to 865 identified under loop 3 are executed repetitively for that cluster for multiple iterations until the trained central ML model attains an acceptable level. This now completes one iteration or epoch of the operation phase of the central computing device 103 and the local computing devices 102*a*-102*n*.

A process or method for managing operational temperature conditions of a base station 101 in the communication system 200 using the local computing device 102 of the base station is illustrated in the sequence diagram of FIG. 9. In FIG. 9, a schematic illustration of how Deep-Q RL is used for training the local ML model in a local computing device associated with a base station is shown i.e., the training phase explained above under functioning of the local computing device 102.

In step 905, the local computing device 102 initializes a Deep-Q network (DQN) i.e., the local ML model and a target network (TQN) by initializing (e.g., randomizing) the weights of the DQN and TQN. The initialization parameters i.e., the values of weights of DQN and TQN are typically set to generic values so that the DQN and TQN does not initially favour any particular action or actions over other actions, however in some embodiments the initialization parameters may be set to non-generic values. In step 910, the local computing device 102 initializes a buffer that is used for storing data used as input for training process of the local ML model for example, a cyclic buffer of some capacity. In step 915, the local computing device 102 acquires information on the initial or current state description S of the base station 101 from the baseband unit of the base station 101. The state description S may be characterized using the base station specific data comprising property measurements of one or more properties affecting the operational temperature conditions of the base station explained above i.e., environmental or climatic factors, state factors, information about the hardware and/or software and so on.

The steps 920 to 955 identified under the Loop may be executed repetitively for K iterations or episodes wherein, K is a preconfigurable value set based on the various functioning requirements of the communication system 200. In step 920, in the local computing device 102, the local ML model generates one or more actions to be taken for the acquired state description S and one of these actions A is then selected to be implemented. The action A to be implemented is selected by the local ML model from actions available to the local ML model with the aim of maximizing the cumulative reward. In step 925, the selected action A to be implemented is then transmitted back to the base station 101 and put into effect for managing the operational temperature of the base station 101 by adjusting the operations of the fans and/or the heater. The result of the action A implemented is a change in the state description S' in the base station 101. The action A also results in a (numerical, typically scalar) reward R generated using a reward function, which is a measure of effect of the action A resulting in changed state descriptions S'. In step 930, the information about the changed state descriptions S' along with the reward R, is transmitted from the baseband unit of the base station 101 to the local ML model in the local computing device 102. In step 930, the information about experience <current state S, action A, new/changed state S, reward R> are stored into the buffer in the local computing device 102. The steps 920 to 935 are then executed for multiple iterations or episodes wherein in each succeeding iteration based on the changed state descriptions S' and the reward R received from the base station 101, the local ML model will accordingly take the next appropriate action A in terms of managing the operational temperature of the base station 101 by adjusting the speed of the fans and/or the output signal to the heater.

After every $L^{th}$ iteration or episodes have elapsed, wherein, L is a preconfigurable value set based on the various functioning requirements of the communication system 200, the step 940 is executed in the local computing device 102. In step 940, M random experiences are selected from the buffer i.e., a set comprising M actions wherein, M is a preconfigurable value or condition set based on the various functioning requirements of the communication system 200. For training DQN i.e., the local ML model in the local computing device 102, a set of M actions are determined based on an exploration and exploitation process of the different states of the base station specific data. In step 945, the target is calculated using the TQN weights i.e., a reward is generated for each action of the set of actions using a reward function wherein the reward typically is a scalar value indicating how well the base station 101 responded when the action was implemented. In step 950, a gradient descent is performed in DQN based on deviation of predicted value versus actual value (mean squared error), wherein actual value is given from target i.e., a subset of actions from the set of actions is determined such that the generated reward for each action of the subset of actions is above a predefined level of acceptance for example, the predefined level of acceptance is configured as greater or equal to 0.75. The subset of actions determined are supposed to have the most beneficial effect on the base station 101. The DQN, i.e., the local ML model in the local computing device 102 is trained using the determined subset of actions. After every $J^{th}$ iteration or episodes have elapsed, wherein, J is a preconfigurable value set based on the various functioning requirements of the communication system 200, the step 955 is executed the DQN weights are copied to the TQN i.e., the TQN is never trained. All values K, L, M and N are preset or preconfigurable, for example, K may be in the order of tens of thousands (e.g., 60.000 episodes), L in the order of hundreds (e.g., 200 episodes) and J in the order of thousands (e.g., 2000 episodes).

Figures 10, 11:
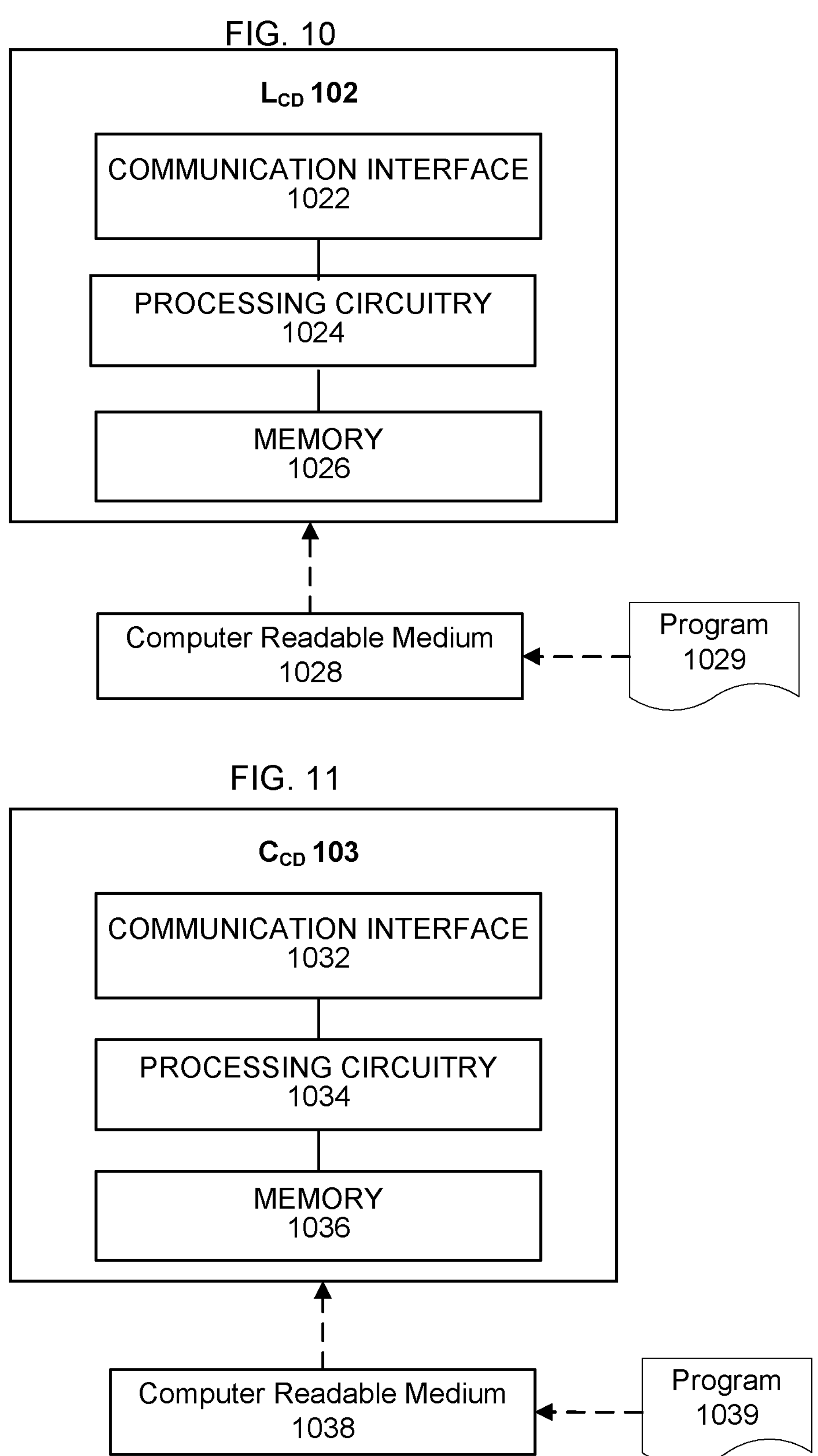
FIG. 10 shows a schematic illustration of a local computing device according to embodiments herein.
FIG. 11 shows a schematic illustration of a global computing device according to embodiments herein.

In FIG. 10, a schematic block diagram of a local computing device 102 in accordance with an embodiment of the present disclosure is shown. The local computing device 102 may execute method 500 for example, according to computer readable instructions received from a computer program. It will be understood that some of the modules illustrated in FIG. 10 are software implemented functional units or modules and may be realized in any appropriate combination of software modules.

The local computing device 102 may further comprise a communication interface 1022, which is for facilitating the communication between the different entities within as well as outside the local computing device 102. In some examples, the interface may, for example, include a transceiver configured to transmit and receive radio signals over an air interface in accordance with a suitable standard. The local computing device 102 may further comprise a processing circuitry 1024, which may include one or more processors (e.g., a general-purpose microprocessor and/or one or more other processors, such as an application specific integrated circuit (ASIC), field-programmable gate arrays (FPGAs), and the like). The local computing device 102 may further comprise a memory 1026, which may be provided, e.g., for reading and/or storing data during execution of software instructions in the processors 1024. The memory 1026 can be any combination of read and write memory (RAM) and read only memory (ROM) and may also comprise persistent storage, which, for example, can be any single one or combination of magnetic memory, optical memory, solid state memory or even remotely mounted memory.

The local computing device 102 may further comprise a computer readable storage medium 1028. On this computer readable storage medium 1028, a computer program 1029 can be stored and the computer program 1029 can cause the processor in the processing circuitry 1024 and thereto operatively coupled entities and devices, such as the memory 1026 etc. to execute methods according to the disclosure described herein. The computer program 1029 may thus provide means for performing any steps as herein disclosed. In some embodiments, the computer-readable storage medium 1028 may be a non-transitory computer-readable storage medium, such as memory stick, or stored in the cloud space.

In FIG. 11, a schematic block diagram of a global computing device 103 in accordance with an embodiment of the present disclosure is shown. The global computing device 103 may execute method 300 for example, according to computer readable instructions received from a computer program. It will be understood that some of the modules illustrated in FIG. 11 are software implemented functional units or modules and may be realized in any appropriate combination of software modules.

The global computing device 103 may further comprise a communication interface 1032, which is for facilitating the communication between the different entities within as well as outside the global computing device 103. In some examples, the interface may, for example, include a transceiver configured to transmit and receive radio signals over an air interface in accordance with a suitable standard. The global computing device 103 may further comprise a processing circuitry 1034, which may include one or more processors (e.g., a general-purpose microprocessor and/or one or more other processors, such as an application specific integrated circuit (ASIC), field-programmable gate arrays (FPGAs), and the like). The global computing device 103 may further comprise a memory 1036, which may be provided, e.g., for reading and/or storing data during execution of software instructions in the processors 1034. The memory 1036 can be any combination of read and write memory (RAM) and read only memory (ROM) and may also comprise persistent storage, which, for example, can be any single one or combination of magnetic memory, optical memory, solid state memory or even remotely mounted memory.

The global computing device 103 may further comprise a computer readable storage medium 1038. On this computer readable storage medium 1038, a computer program 1039 can be stored and the computer program 1039 can cause the processor in the processing circuitry 1034 and thereto operatively coupled entities and devices, such as the memory 1036 etc. to execute methods according to the disclosure described herein. The computer program 1039 may thus provide means for performing any steps as herein disclosed. In some embodiments, the computer-readable storage medium 1038 may be a non-transitory computer-readable storage medium, such as memory stick, or stored in the cloud space.

The embodiments herein are not limited to the above-described preferred embodiments. Various alternatives, modifications and equivalents may be used. However, as is readily appreciated by a person skilled in the art, other embodiments than the ones disclosed above are equally possible within the scope of the inventive concept, as defined by the appended patent claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

As used herein, the expression "in some embodiments" has been used to indicate that the features of the embodiment described may be combined with any other embodiment or example disclosed herein. As used herein, the expression "in some examples" has been used to indicate that the features of the example described may be combined with any other embodiment or example disclosed herein. As used herein, the expression "at least one of:" followed by a list of alternatives separated by commas, and wherein the last alternative is preceded by the "and" term, may be understood to mean that only one of the lists of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

The invention claimed is:

1. A method for managing operational temperature conditions of one or more base stations in a communication system, the method being executed in a central computing device in the communication system, the method comprising:

acquiring, for each local computing device of a first group of local computing devices associated with the one or more base stations, initial operational parameters;

determining one or more clusters by grouping each local computing device of the first group of local computing devices under one of the determined clusters based on the acquired initial operational parameters;

training a central machine learning (ML) model for each determined cluster;

acquiring, for each local computing device of a second group of local computing devices associated with the one or more base stations, updated operational parameters;

computing an operational difference measure of the second group of local computing devices using the acquired updated operational parameters; and determining optimized operational temperature conditions to be transmitted to the second group of local computing devices by using distributed ML, in response to determining that the computed operational difference measure is less than a threshold value.

2. The method according to claim 1, further comprising:

repeating the execution of the steps of acquiring, computing and determining, after completing the execution of step of determining optimized operational temperature conditions.

3. The method according to claim 1, further comprising:

performing regrouping of the one or more clusters by grouping each local computing device of the second group of local computing devices under one of the new clusters based on the acquired updated operational parameters, in response to determining that the computed operational difference measure is greater than the threshold value; and repeating the execution of the steps of training, acquiring, computing and determining after completing the execution of step of performing regrouping of the one or more clusters.

4. The method according to claim 1, wherein the one or more of the local computing devices of the second group of local computing devices are different from the local computing devices of the first group of local computing devices.

5. The method according to claim 1, wherein all the local computing devices of the second group of local computing devices are same as the local computing devices of the first group of local computing devices.

6. The method according to claim 1, wherein the initial operational parameters for each local computing device of the first group of local computing devices and the updated operational parameters for each local computing device of the second group of local computing devices comprises property measurements of the one or more properties affecting the operational temperature conditions of the one or more base stations.

7. The method according to claim 6, wherein the one or more properties affecting the operational temperature conditions of the one or more base stations comprise at least one of: a load on the base station; an ambient temperature experienced by the base station; an internal temperature of the base station; an information about hardware and/or software installed in the base station; a humidity level recorded at the base station; a pressure variations recorded at the base station; and a level of airflow recorded at the base station.

8. The method according to claim 1, wherein, determining one or more clusters is performed using any one of K-means clustering, hierarchical clustering, K-medoids, Density-Based Spatial Clustering of Applications with Noise (DBSCAN), Gaussian Mixture Model (GMM) or K-Nearest Neighbor (KNN);

grouping each local computing device of the first group of local computing devices is based on similarity measure of the acquired operational parameters; and grouping each local computing device of the second group of local computing devices is based on similarity measure of the acquired updated operational parameters.

9. The method according to claim 1, wherein the step of determining the optimized operational temperature conditions to the second group of local computing devices by using distributed ML, further comprising:

transmitting weights and model parameters of the trained central ML model of each determined cluster to each of the local computing devices grouped under each determined cluster;

acquiring weights and model parameters of a trained local ML model from each of the local computing devices grouped under each determined cluster;

training each central ML model of each determined cluster using at least one or more of the acquired weights and model parameters of the trained local ML models; and performing repetitively the steps of transmitting, acquiring and training until the trained central ML model of each determined cluster attains an acceptable level.

10. The method according to claim 9, wherein, the weights and model parameters of the trained central ML model transmitted to each of the local computing devices grouped under the each determined cluster comprises information about optimal operational temperature conditions of the one or more base stations; and the training of each central ML model is performed using federated averaging.

11. The method according to claim 1, wherein the step of computing the operational difference measure, further comprising:

determining operational parameters difference using the acquired updated operational parameters and previous operational parameters for each local computing device of the second group of local computing devices; and computing the operational difference measure of the second group of local computing devices using the determined operational parameters difference of each local computing device of the second group of local computing devices wherein the operational parameters difference measure is a normalized value from 0 to 1.

12. The method according to claim 9, wherein the acceptable level for the trained central ML model of each determined cluster is identified based on the acquired weights and model parameters of the trained local ML model from each of the local computing devices grouped under each determined cluster.

13. The method according to claim 1, wherein the central ML model is an artificial neural network (ANN).

14. The method according to claim 1, wherein the central computing device is implemented as an entity of the communication system or as an entity of a cloud network.

15. The method according to claim 1, wherein the communication system comprises one or more of a fourth generation, 4G, mobile network and a fifth generation, 5G, mobile network.

16. A method for managing operational temperature conditions of a base station in a communication system, the method being executed in a local computing device in the communication system, the method comprising:

acquiring from a central computing device, weights and model parameters of a central machine learning (ML) model;

training a local ML model using the acquired weights and model parameters of the central ML model and base station specific data wherein, ML is utilized for training the local ML model and the base station specific data comprises property measurements of one or more properties affecting the operational temperature conditions of the base station;

transmitting to the central computing device, weights and model parameters of the trained local ML model;

transmitting to the central computing device, operational parameters generated based on the base station specific data; and determining optimized operational temperature conditions to be applied to the base station using the trained local ML model.

17. A central computing device in a communication system for managing operational temperature conditions of one or more base stations in the communication system, the central computing device comprising, processing circuitry comprising at least one processor;

at least one memory connected to the at least one processor and storing program code that is executed by the at least one processor, whereby the central computing device is operable to:

acquire for each local computing device of a first group of local computing devices associated with the one or more base stations, initial operational parameters;

determine one or more clusters by grouping each local computing device of the first group of local computing devices under one of the determined clusters based on the acquired operational parameters;

train a central machine learning (ML) model for each determined cluster;

acquire, for each local computing device of a second group of local computing devices associated with the one or more base stations, updated operational parameters;

compute an operational difference measure of the second group of local computing devices using the acquired updated operational parameters; and determine optimized operational temperature conditions to be transmitted to the second group of local computing devices by using distributed ML, in response to determining that the computed operational difference measure is less than a threshold value.

18. A local computing device in a communication system for managing operational temperature conditions of a base station in the communication system, the local computing device comprising:

processing circuitry comprising at least one processor;

at least one memory connected to the at least one processor and storing program code that is executed by the at least one processor, whereby the local computing device is operable to:

acquire from a central computing device, weights and model parameters of a central machine learning (ML) model;

train a local ML model using the acquired weights and model parameters of the central ML model and base station specific data wherein, ML is utilized for training the local ML model and the base station specific data comprises property measurements of one or more properties affecting the operational temperature conditions of the base station;

transmit to the central computing device, weights and model parameters of the trained local ML model;

transmit to the central computing device, operational parameters generated based on the base station specific data; and determine optimized operational temperature conditions to be applied to the base station using the trained local ML model.

19. A computer program product comprising a non-transitory computer-readable medium storing a computer program comprising instructions which, when executed on processing circuitry, cause the processing circuitry to perform a method according to claim 1.

20. A computer program product comprising a non-transitory computer-readable medium storing a computer program comprising instructions which, when executed on processing circuitry, cause the processing circuitry to perform a method according to claim 16.

* * * * *